（12）United States Patent
Motoyama et al.

(10) Patent No.: US 6,578,090 B1
(45) Date of Patent: Jun. 10, 2003

(54) SYSTEM AND METHOD FOR INTERFACING TWO MODULES SUPPORTING VARIOUS APPLICATIONS

(75) Inventors: Tetsuro Motoyama, Cupertino, CA (US); Anurag Bhatnagar, Sunnyvale, CA (US)

(73) Assignees: Ricoh Company, Ltd., Tokyo (JP); Ricoh Corporation, San Jose, CA (US)

( * ) Notice: Subject to any disclaimer, the term of this patent is extended or adjusted under 35 U.S.C. 154(b) by 0 days.

(21) Appl. No.: 09/093,052

(22) Filed: Jun. 8, 1998

(51) Int. Cl.[7] ................................................. G06F 9/44
(52) U.S. Cl. ....................................................... 709/315
(58) Field of Search ................................. 707/100, 102, 707/203; 709/321, 315, 316, 310, 328; 717/116, 140

(56) References Cited

U.S. PATENT DOCUMENTS 5,680,618 A  * 10/1997 Freund ........................ 395/616
5,822,587 A  * 10/1998 McDonald et al. ......... 395/702

OTHER PUBLICATIONS

Grove et al., Profile Guided Receiver Class Prediction Dec. 1995, ACM, pp. 108–123.*
Taivalsaari, On the Notion of Inheritance Sep. 1996, ACM, pp. 438–479.*
Eckel, Polymorphism and Virtual Functions in C+ Oct. 1994, Embedded Systems Programming, pp. 1–17.*
Seidewitz, Controlling inheritance Jan. 1996, JOOP, pp. 36–42.*
Scott Meyers, Effective C++: 50 Specific Ways to Improve Your Programs and Designs, 1992, pp. 123–130.
Erich Gamma, et al., Design Patterns: Elements of Reusable Object–Oriented Software, 1995, pp. 81–116, "Creational Patterns".

* cited by examiner

*Primary Examiner*—Sue Lao
(74) *Attorney, Agent, or Firm*—Oblon, Spivak, McClelland, Maier & Neustadt, P.C.

(57) ABSTRACT

A method, system, object-oriented system, and computer program product for interfacing two software modules to support various applications. A base class, a zero-level abstract class having a declared virtual function, plural first-level derived classes of the zero-level abstract class having the declared virtual function, and plural second-level classes derived from the base class and the first-level derived classes of the abstract class having the declared virtual function are defined using multiple inheritance so that the virtual function is defined differently for plural instantiated objects of the second-level classes. A first application module communicates with a second application module which processes information to select a software object to be referenced for processing data. The second application module passes a reference defined to reference a first-level derived class and having a value of a reference to the selected software object which is derived from the first-level derived class. The first application module receives the value using a reference defined to reference the zero-level abstract class and then accesses the virtual function defined for the selected software object by a reference in the form of the received reference and the name of the virtual function. There is no need for the first application module to determine which software object type is referenced for execution of the function, as all instantiated software objects are derived from the same abstract class. Therefore, the value passed in the reference is used to access the correct code for processing the data for the desired software object.

12 Claims, 15 Drawing Sheets

```
48 — doDataAnalysisAndReport

72 — localReturnPtr; pointer to AbstractClass
74 — localOK; bool
76 — DataAnalysisUnit.setInputSrc (InputSrc)
78 — Ref1 -> reset()
80 — localOK = DataAnalysisUnit.getAbstractClass (localReturnPtr)
82 — while (localReturnPtr is not zero)
84 — {localReturnPtr -> fcn1 ()
86 — localOK = DataAnalysisUnit.getAbstractClass (localReturnPtr)}
88 — If(not localOK) Notify Error
                                              ⌐ 90
```

*FIG. 2D*

```
56 ── getAbstractClass (reference to Abstract Class Ptr AbPtr)        ─ 101
             (See also Fig.6)
102 ── get Data from InputSrc
104 ── If Data is EOF
106 ──   AbPtr=0
108 ──   return Yes
110 ── If Data contains Derived Class 1 data
112 ──   Ptr1 -> setVar1 (Data.Value 1)
114 ──   AbPtr = Ptr1
116 ──   return Yes
118 ── If Data contains Derived Class 2 data
120 ──   Ptr2 -> setVar2 (Data.Value2)
122 ──   Ptr2 -> setVar3 (Data.Value3)
124 ──   AbPtr = Ptr2
126 ──   return Yes
128 ── AbPtr = 0
130 ── return No
```

*FIG. 2E*

SYSTEM AND METHOD FOR INTERFACING TWO MODULES SUPPORTING VARIOUS APPLICATIONS

CROSS-REFERENCES TO RELATED APPLICATIONS

This application is related to three other patent applications: U.S. patent application Ser. No. 08/997,707 entitled "Method and Apparatus For Mapping Structured Information to Different Structured Information", filed on Dec. 23, 1997, (issued as U.S. Pat. No. 6,009,436 on Dec. 28, 1999), and incorporated herein by reference, U.S. patent application Ser. No. 08/997,482 entitled "Object-Oriented System and Computer Program Product For Mapping Structured Information to Different Structured Information", filed on Dec. 23, 1997, (issued as U.S. Pat. No. 6,085,196 on Jul. 4, 2000), and incorporated herein by reference, and U.S. patent application Ser. No. 09/007,100 entitled "Method and System For Resetting References to Deleted Software Structures", filed on Jan. 14, 1998, (issued as U.S. Pat. No. 6,078,931 on Jun. 20, 2000), and incorporated herein by reference.

BACKGROUND OF THE INVENTION

1. Field of the Invention

This invention relates generally to interfacing two software modules, one of which is a processing module to send various data structures to the other software module which is an application processing module which utilizes the data structures. The present invention is more specifically related to use of an abstract class having a virtual function and a plurality of first level derived classes of the abstract class defining the plurality of data structures to be sent and a plurality of second level derived classes of the plurality of first level derived classes of the abstract class, each second level derived class defining the virtual function to utilize the data structures. The invention is more specifically related to a method, system, computer program product, and a memory for interfacing two software modules.

2. Discussion of the Background

Object-oriented-technology is based upon the manipulation of software objects instantiated from software classes. A software class is considered as a user defined type equivalent to normal types such as integer type. The software class is typically declared with data items and procedures or software methods that operate on the data items. Many high-level languages, including C++, support the declaration of a class. Software objects instantiated for software classes are called instances of the software classes from which they are instantiated, and have all the features, or the "type" of the software class used for instantiation.

An abstract class is a software class that is not intended to be instantiated. The purpose of an abstract class is to define interfaces shared by derived classes through inheritance. An abstract class is frequently used with virtual functions or software methods which declare the interfaces with or without definitions. When a software class derived from an abstract class defines an inherited virtual function of the abstract class, the virtual function of the derived software class will be executed even when the instantiated object of the derived software class is accessed through a reference type of the base abstract class. If the function referenced is not a virtual function, the base class function or software method will be executed. This technique allows the client or user of the software object to execute the correct function or software method with only the knowledge of the abstract class. Many examples of such techniques are shown in Gamma, E., Helm, R., Johnson, R. and Vlissides, J., *Design Patterns: Elements of Reusable Software*, Addison-Wesley, Massachusetts, 1995, which is incorporated herein by reference.

Object-Oriented Programming ("OOP") is a programming methodology in which a program is viewed as a collection of discrete objects that are self-contained collections of data structures and routines that interact with other objects. As discussed above, a class has data items, structures, and functions or software methods. Data items correspond to variables and literals of prior programming art. Structures are named groupings of related data items and other structures. Software methods correspond to functions and subroutines of prior programming art. An object-oriented framework is a reusable basic design structure, comprising abstract and concrete classes, that assists in building applications.

Pointers used for accessing specific objects, data items, and software methods are data items which include values of system equivalents of absolute addresses in computer memory. Null pointers, or zero pointers, are pointer variables or literals which have been assigned a system value, for example, zero, denoting that a specific pointer is currently pointing to a null or non-existent item. References and reference variables are generally data items which have values of system equivalents of absolute addresses in computer memory. In programming terminology, dereferencing a reference means accessing information at the computer memory address referenced by a pointer or reference.

A compiler is a software program that translates programs written in a high-level language, such as C++ or Pascal, into an intermediate language or machine language which is specific to a particular computer system configuration. In general programming terminology, data items, variables, and functions or software methods are declared so that a compiler knows specific names the programmer will use in the high-level language code to be translated. A compiler typically creates a symbol table to keep track of valid data items, variable names, function or software method names, structures, and addresses thereof as space is allocated. This process enables the compiler to assign numeric addresses to references to the data items, variables, functions or software methods, or software structures, or to create executable code to enable referencing of the data items, variables, functions or software methods or software structures during execution of the executable code that is output from the compilation process. For purposes of this invention, a declaration of a data item, variable, function, or software method is a declaration of the name of the data item, variable, function, or software method. A definition of the data item, variable, function, or software method is the defining content for the data item, variable, function, or software method. For example, the declaration of a software method named "draw" includes the name and types of interfaces for the software method, but not the defining code. The definition of the software method named "draw" includes the name of the software method, any needed data type information, information concerning parameters to be passed, and the defining code for the software method. In some programming languages, a definition is also a declaration.

The three main features of object-oriented programming are inheritance, encapsulation, and polymorphism. Encapsulation and polymorphism have already been described and are already well known in patents relating to object-oriented systems. Inheritance allows a programmer to establish a general software class with features which are desirable for a wide range of software objects. For example, if a programmer designs a software class shape having certain generalized features such as a closed convex shape and a generalized computable property called "draw," it is then possible to construct subclasses derived from the superclass shape such as triangles, squares and circles, all having the shared properties of the parent class shape, with additional properties such as the lengths of sides or a radius value. It is also possible, for example, to have derived subclasses of classes which have additional properties such as a solid circle and a dashed circle.

The class shape is considered a base class, in that instantiations of actual objects is performed in its subclasses. The class shape is also considered an abstract class, in that it makes no sense to instantiate a shape object since object properties are not fully defined for the class shape. An abstract class is a class from which no objects are instantiated, and for which an interface for subclasses is established. The class shape establishes certain properties inherent to all shape subclasses for inheritance purposes. For example, an operation named "draw" of a shape, a commonly requested operation among users of shapes, can be declared as a software method for the class shape, to be inherited in all subclasses of the class shape. A programmer creates new classes derived from the class shape which inherit all desired features of the class shape without rewriting code already written for the class shape. This feature, called reusability, offers tremendous savings of time and resources in system development, maintenance, and support.

In many high-level programming languages, a programmer declares a derived class by providing the name of the class being declared and the names of base classes from which the derived class is to inherit properties. In the shape example discussed previously, the class shape is considered to be at a top level of an inheritance hierarchy, and is abstract since it makes no sense to instantiate shape objects with no definition of an actual shape, for example a square or a circle. Subclasses declared a level below the class shape are the subclasses specifically derived from the class shape, such as triangles, squares and circles. The subclasses triangles, squares and circles are then called children or subclasses of the class shape, and the class shape is called a parent or superclass of the classes triangles, squares and circles. Declarations of the subclasses specifically refer to the class shape for establishing inheritance. Subclasses a level below the class circle are the subclasses specifically derived from the class circle, such as solid circle and dashed circle. The classes solid circle and dashed circle are then called children or subclasses of the class circle, and the class circle is called a parent or superclass of the classes solid circle and dashed circle. Declarations of these subclasses specifically refer to the parent class circle for establishing inheritance. Since the class circle is derived from the class shape, the derived classes solid circle and dashed circle inherit all features of the class shape, and all additional features of the class circle.

In object-oriented programming, a pure virtual function is a function or software method declared with no defining code in an abstract class. For example, in declaring the abstract class shape described previously, a programmer declares a pure virtual function named "draw," with no defining code, as a software method for the abstract class shape. Subclasses derived from the abstract class shape inherit the pure virtual function as a virtual function having the same name as the pure virtual function of the parent abstract class. The function name or software method name has executable code defined at some level in subclasses of the parent abstract class.

For the shape example discussed previously, assume the abstract class shape has a declaration for the pure virtual function named "draw." Using formulas from basic algebra and geometry, the actual code executed for drawing a shape differs from one shape to another, so the code for the function named "draw" is defined only in derived base classes used for instantiation of software objects. In C++, the virtual function is declared as a virtual function in all abstract subclasses to be used as superclasses for derived subclasses from which objects are to be instantiated with defining code for the virtual function of the abstract classes. For example, drawing a circle requires plotting points equidistant from a center point. Drawing a square generally requires plotting points to form four straight sides having equal length which are connected at right angles. Therefore, a request to draw a particular shape needs to accommodate the different properties of various desired shapes. Using a pure virtual function named "draw" in the abstract class shape, the code for drawing a circle is included as a software method named "draw" for instantiated circle software objects, and the code for drawing a square is included as a software method named "draw" for instantiated square software objects. A reference to a software object instance of the software method named "draw" causes execution of the code to draw the shape represented by the software object instance. For this example, the shape of a circle is drawn if the code for an instantiated circle object is accessed, and a square is drawn if the code for an instantiated square object is accessed.

In C++, the code for the desired software method named "draw" is accessible by using a format including a reference to the desired circle or square instantiated software object and the name "draw." A comprehensive discussion of the pure virtual function property of abstract classes in C++ is provided in Stroustrup, B., *The Design and Evolution of C++*, Addison-Wesley, Massachusetts, 1994, and in Meyers, S., *Effective C++: 50 Specific Ways to Improve Your Programs and Designs*, Addison-Wesley, Massachusetts, 1992, which are incorporated herein by reference.

Some object-oriented programming languages support multiple inheritance, wherein a software class derived from plural existing parent software classes inherits attributes and software methods from all parent software classes included in the desired derivation. As discussed above with regard to inheritance, a child subclass is declared by supplying the name of the class to be declared, and the names of the desired parent base classes for multiple inheritance. Additional properties for the child subclass are then declared and/or defined.

A comprehensive discussion of OOP is provided in Coad, P. and Yourdon, E., *Object-Oriented Analysis, Second Edition*, Prentice-Hall, Inc., New Jersey, 1991, and in Booch, G., *Object-Oriented Analysis and Design with Applications, Second Edition*, Addison Wesley Longman, California, 1994, which are incorporated herein by reference.

Software modules are collections of routines and data structures that perform a particular task or implement a particular abstract data type and manipulate software objects. Different software modules have varying requirements for data types to be used in processing. As data is passed from one software module to the next for various tasks to be performed, communication is necessary to determine what data types of data items are to be accessed and manipulated. For example, if a first software module manipulates data items having an integer data type and requires the data items to be processed by a second software module that manipulates data items having a floating point data type, a conversion from the integer data type to the floating point data type will be necessary before the second software module processes the data items, as integer data type and floating point data type have different internal representations. After the processing, the resulting data items will need to be converted back to integer format before being returned to the first software module.

If two software modules support processing of data items of plural data types, then information concerning the data types of data items sent from one software module to another needs to accompany the data items so that the receiving software module knows how to process the data items received. The receiving module must determine what data type the data items have so that correct code will be executed to accommodate the data type of data items sent. For example, if a first software module performs addition of two data items sent by a second software module, then the first software module must determine whether the two data items sent by the second software module are two integers, two floating point numbers, two complex numbers, two arrays, or some other data type supported by the first software module. Once the data type of the data items is determined, the first software module executes the correct code for adding the two data items together. For example, addition of two integers is a different operation internally from addition of two arrays.

Another example of passing data of different types among software modules is illustrated by a software compiler which generally is a program used to translate a program written in a high level programming language into a program in machine language. For the software compiler program a parser is a software module that breaks up the high level language program into various types of components called tokens and passes the tokens and their types to other software modules to be processed into generated machine code.

In some programming languages such as C, pointer variables are declared and defined to point to a specific data type of data item. A compiler will not generate code for references using a defined pointer variable which does not follow compiler rules concerning compatibility of data type with the pointer declaration and definition. For example, assume a pointer named PTR1 is defined as a pointer to data type float or floating point data type. If PTR1 is referenced to access a data item of data type char or character data type, the compiler recognizes a data type conflict and generally refuses to generate code for the reference in conflict. If the programmer wishes to access the data item having data type char, he/she writes code to convert the data item to type float or he/she writes code to use a pointer to data type float to accommodate the compiler requirements for data type compatibility.

Some programming languages such as C and C++ support type casting of variables and values. Type casting has various formats, for example an integer variable written on the left hand side of an assignment statement having a floating point value on the right hand side is interpreted by the compiler to mean that a conversion is performed by the compiler to store an integer format of the floating point value in the storage allocated for the variable on the left hand side. A statement such as "(float) x" is interpreted to mean that a conversion is to be performed by the compiler to convert the value of the variable x into floating point format, usually for data type compatibility in expressions. The data type and value of the variable x are not affected by the type cast operation.

An information passing technique in the related art involves passing of information between two software modules by passing both the data and information about the data type of data being passed. A sending module sends data and information concerning the data type of the data as parameters or arguments, and a receiving software module receives the data and the information concerning the data type of the data received. The receiving software module is then responsible for determining the data type of data received so that the receiving software module executes correct instructions to process the data type of data received.

In programming languages, data types are used to determine the internal representation of data to be used in software programs. For example, a data item having an internal representation of sixteen bits in two's complement format is of data type integer in many hardware configurations, and a data item having an internal representation of eight bits in American Standard Code for Information Interchange ("ASCII") format is of data type character in many hardware configurations. If a first software module passes an integer as a first data item and an ASCII character as a second data item to a second software module, with a request to add the two data items together and return their sum, the second software module will need information about the data type of the received data items so that the second software module will know what code to execute in order to perform an addition of the two data items of different data types and different internal representations.

If a user needs to access a software module to perform a function, with the processing results to be used by plural software objects having different structures as data types, the related art scheme of passing data items along with information concerning the data type of the data items sent involves the disadvantage of writing different executable code to handle every case of data type information for every type of software object in the system. If the data types are modified, for example, by adding new software object types, or by modification of existing software object types, the code to handle the various data types must be updated or rewritten for every modification made in the system. Such updating or rewriting of the software may be a time consuming and expensive task.

SUMMARY OF THE INVENTION

Accordingly, an object of this invention is to provide a novel method, system, object-oriented system, and computer program product for interfacing two software modules supporting various applications. Exemplary applications include parsing tokens of documents and processing the component tokens passed from the parsing process.

It is a further object of this invention is to provide a novel method, system, object-oriented system, and computer program product for interfacing an application software module and a processing software module supporting various applications.

It is a further object of this invention is to provide a novel method, system, object-oriented system, and computer program product for interfacing an application software module and a parser software module supporting applications for parsing input files in a first structured format and transforming the input files into output files in a second structured format.

It is a further object of this invention to provide a novel method, system, object-oriented system, and computer program product for interfacing an application software module and a parser software module supporting applications for parsing input documents in Standard Generalized Markup Language ("SGML") format and transforming the input documents into output documents in HyperText Markup Language ("HTML") format.

These and other objects are accomplished by a novel method, system, object-oriented system, and computer program product for interfacing two processes, a data analysis process and an application process. The data analysis process analyzes input data and passes various kinds of data structures to the application process. The application process uses the received data for its own purposes. The main purpose of the invention is to allow the interface between two processes to be independent of the definition and local structure of the application process to support different application processes that use the passed data differently depending upon the desired application.

An abstract class with one virtual function is used to declare a function to be defined by different applications while the derived classes from the abstract class add various data items that are abstracted by a data analysis unit. The data analysis unit therefore passes different kinds of objects to an application process unit. According to the present invention, the application process unit accesses a passed object as an object derived from the abstract classes. The application process unit executes the virtual function without knowing the exact nature of the software object that defines the virtual function.

In addition, the present invention uses multiple inheritance and static data to allow common data to be shared among the virtual functions of different application environments. An alternative design to multiple inheritance is discussed for data sharing.

The data sharing discussed above is accomplished by creating a base application software class and an abstract software class having a declared virtual function which is derived by plural subclasses using multiple inheritance. The virtual function is defined in executable software code at some level for instantiation of plural software objects having different code defined for the virtual function. An application software module accesses the defined code for the inherited virtual function of an instantiated object by using a pointer defined to reference the abstract class and set to have a value of a reference to the desired instantiated object. The pointer is set to reference the desired software object by a software module different from the application software module. Therefore, the application software module accessing the defined code for the virtual function in an instantiated software object only needs the pointer and the name of the virtual function as declared for the abstract class, and does not need information concerning which instantiated object or type of instantiated object is accessed by the call to the software method.

An exemplary application of the present invention is parsing and processing documents written in markup languages to transform the documents from a first structured format into a second structured format. A parser parses an input document to break it into component parts called tokens. In order to support processing of different types of tokens, a multi-level object-oriented software inheritance structure is implemented as an interface for software modules involved in processing the documents and tokens.

At the top or zero level of the multi-level interface structure, a zero-level abstract software class having a declared virtual function for processing and transforming tokens from the first structured format to the second structured format is declared. At the next level down from the top or zero level of the multi-level interface structure, plural first-level derived software subclasses of the zero-level abstract class are declared having different data structures added to the zero level abstract class. In order to enable access to common data items for all instantiated objects, a base application software class is declared having defined data items which are generally needed by instantiated objects of the system.

At the next level down from the first level of the multi-level interface structure, plural second-level software subclasses are declared with each second-level software subclass derived from one of the first-level derived software subclasses having the virtual function and the base application data software class using multiple inheritance. The plural second-level software subclasses have a definition for software code for the virtual function, with different code in different subclasses for processing and transforming different token types. Each second-level software subclass is designed to process a particular type of token recognized by the parser.

A driver application software module calls the parser designed as a parser application software module for processing an input document. The parser application software module parses the input document to determine plural tokens which are component parts of the document needing further processing for desired output in a different format. The parser application software module determines the type of token parsed and the instantiated object type needed to process the parsed token. The parser application software module has plural pointers which are defined to reference the derived first-level subclasses of the zero-level abstract class and which are set to have values of the software objects instantiated from the second-level software subclasses. The parser application software module sets a first-level pointer declared to reference the first-level abstract software class to have a value of a reference to the desired instantiated software object by setting the first-level pointer to the value of a first-level pointer defined to reference the derived first-level subclasses from which the selected software instantiated object is derived. The parser application software module then passes the first-level pointer to the driver application software module.

The driver application software module receives the pointer sent by the parser application software module by using a pointer defined to reference the zero-level software abstract class. The driver application software module then requests processing of the token by referencing the defined code of an instantiated software object using only the zero-level pointer and the name of the declared virtual function of the zero-level abstract class. The driver application software module has no need to know which type of token has been recognized by the parser application software module, and no need to know which instantiated software object is accessed to process the recognized token. If additions, deletions or modifications are needed by the system for token types to be processed, no modification is needed for the driver application software module. Therefore, reusability of code is possible.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2D illustrates a doDataAnalysisAndReport software method;

FIG. 2E illustrates a getAbstractClass software method;

DESCRIPTION OF THE PREFERRED EMBODIMENTS

Figure 1:
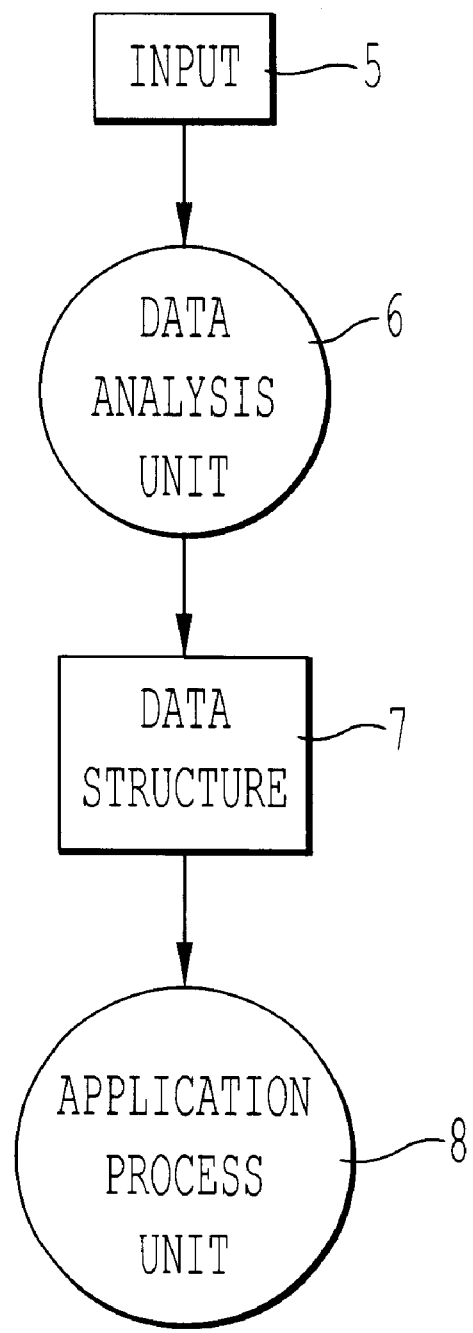
FIG. 1 is a data flow diagram showing processing of input data for the current invention.

Referring now to the drawings, wherein like reference numerals designate identical or corresponding parts throughout the several views, and more particularly to FIG. 1 thereof, there is illustrated a data flow of an Input 5 through a Data Analysis Unit 6, which outputs a Data Structure 7 to be input to an Application Process Unit 8. The Data Analysis Unit 6 analyzes the Input 5 to determine a type of processing to be performed on the Input 5. The Data Analysis Unit 6 then sends the Data Structure 7, which is of a data type corresponding to the received Input 5, to the Application Process Unit 8 for processing. FIG. 1 illustrates the intent of the system where the APPLICATION PROCESS UNIT 8 must perform various tasks depending upon the type of DATA STRUCTURE 7. The prior art to the problem is to add the type information in the DATA STRUCTURE 7 so that the receiver can check the type to take the proper action. The present invention shows that the user of an object-oriented method can eliminate the need of type information. Moreover, the present invention shows that even when an application changes, the DATA ANALYSIS UNIT 6 does not need to change its processing to the changing application needs.

Figure 2A:
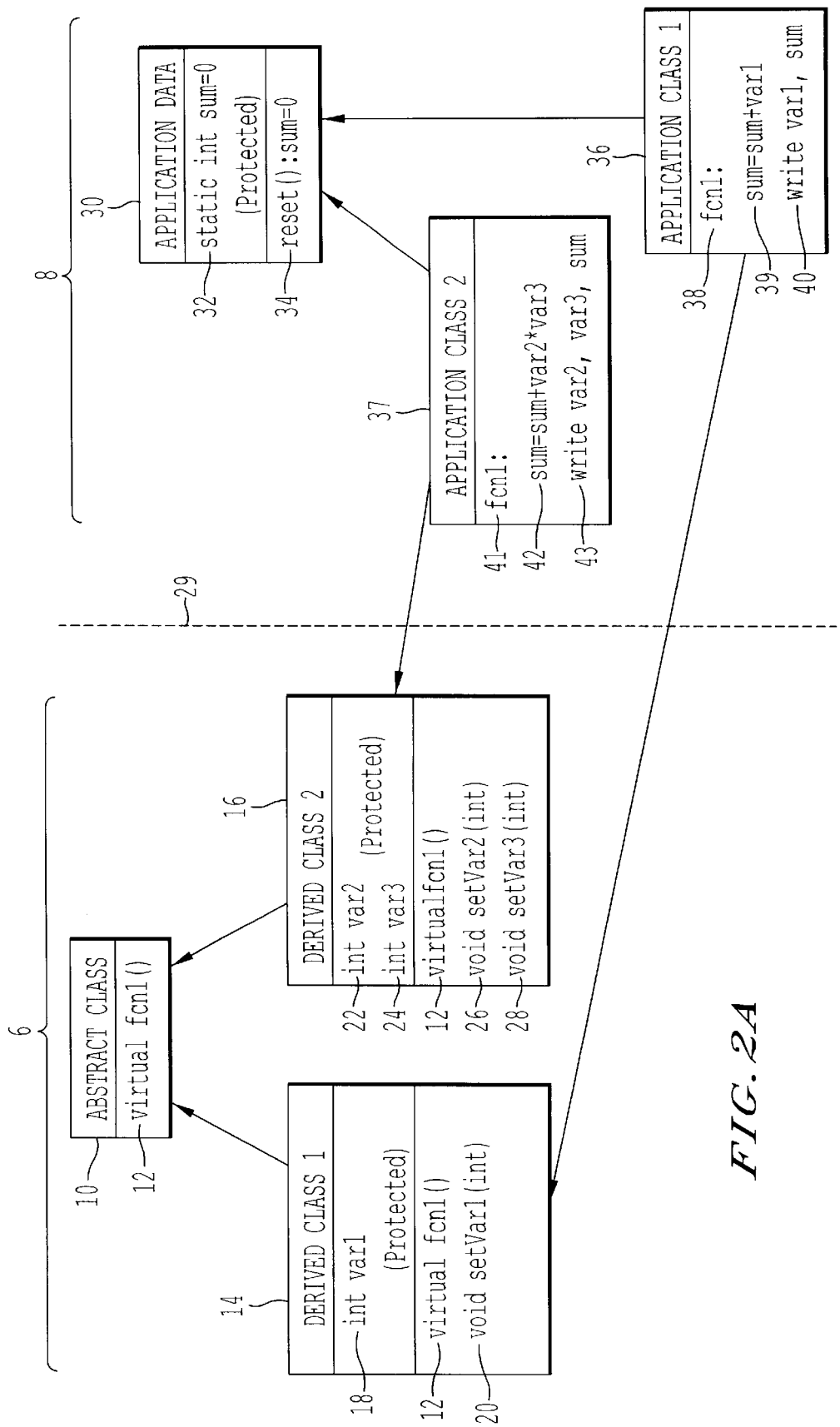
FIG. 2A is a class structure diagram of an exemplary Data Analysis Unit and an exemplary Application Process Unit using multiple inheritance.

FIG. 2A is a class diagram showing a class structure using multiple inheritance to construct various data structures with the functions corresponding to the DATA STRUCTURE 7 of FIG. 1. A left side of a dashed line 29 of FIG. 2A has structures pertaining to the Data Analysis Unit 6 of FIG. 1. A right side of the dashed line 29 has structures relating to the Application Process Unit 8 of FIG. 1. The dashed line 29 is an imaginary line Band is illustrated in order to clearly show the associations of the different software structures. The Data Analysis Unit 6 of FIG. 1 receives and analyzes input data to determine the type of the input for processing by the Application Process Unit 8.

A zero-level software Abstract Class 10 is a software abstract class which has a pure virtual function, fcn1 12, which is declared but not defined in the Abstract Class 10. The empty parentheses after the function names in FIG. 2A denote functions or software methods which pass no specified parameters. A first-level first software Derived Class 1 14 and a first-level second software Derived Class 2 16 are derived from the Abstract Class 10. Each of the Derived Class 1 14 and the Derived Class 2 16 inherit the virtual fcn1 12 from the Abstract Class 10. The Derived Class 1 14 and the Derived Class 2 16 each declare but do not define the virtual fcn1 12.

The Derived Class 1 14 has a variable var1 which has an integer data type and which is protected, which in this case means var1 18 is directly accessible only to objects instantiated from the Derived Class 1 14 or instantiated from classes derived from the Derived Class 1 14. The Derived Class 1 14 with var1 18 corresponds to a type of DATA STRUCTURE 7 of FIG. 1 that needs to be processed by the APPLICATION PROCESS UNIT 8. The Derived Class 1 14 of FIG. 2A also has a software method setVar1 20 which is called by objects of other software classes to set the value of the variable var1 18 existing in a particular instantiated object to have a desired value. As in C and C++, the word "void" preceding the name of a function or software method specifies that a call to the function or software method returns no value other than those returned through parameters specified in a parameter list enclosed in parentheses after the function or software method name.

The Derived Class 2 16 has two variables var2 22 and var3 24, both of which are of integer data type and are protected, as discussed above with regard to the var1 18. The Derived Class 2 16 with var2 22 and var3 24 corresponds to a type of DATA STRUCTURE 7 of FIG. 1 that needs to be processed by the APPLICATION PROCESS UNIT 8. The Derived Class 2 16 of FIG. 2A has two software methods, setVar2 26 and setVar3 28, which are called by other software objects to set the values of var2 22 and var3 24, respectively, existing in a particular instantiated object, to have desired values.

If the Data Analysis Unit 6 of FIG. 1 determines that the Input 5 is of a type for Derived Class 1 14 of FIG. 2A, then the Data Analysis Unit 6 of FIG. 1 requests that the Input 5 value be stored in the var1 18 of FIG. 2A for a desired instantiated object.

If the Data Analysis Unit 6 of FIG. 1 determines that the Input 5 has a type of the Derived Class 2 16 of FIG. 2A, then the Data Analysis Unit 6 of FIG. 1 requests that var2 22 and var3 24 of FIG. 2A for a desired instantiated object be set to have values from the Input 5. It is to be noted that the data structures identified by the Data Analysis Unit are not restricted to having the same type. For the example shown in FIG. 2A, the variables var1 18, var2 22 and var3 24 have integer type, although the variables may have any type recognized by the compiler used to compile the code for the classes and objects.

On the right hand side of the dashed line 29 of FIG. 2A, an Application Data software class 30 defines data to be used by derived and defined functions of the virtual function fcn1

12. A variable sum 32 is of static integer data type and is protected. The static variable sum 32 has one storage location allocated that is accessible to any software object instance of the Application Data software class 30 or by any subclass of the Application Data class 30. The static variable sum 32 is initialized to have a value of 0, which may be modified directly by any instantiated object of the Application Data class 30 or any subclass of the Application Data class 30. Any modification to the static variable sum 32 is recognized by all instantiated objects having access to the static variable sum 32. A software method reset 34 is defined to reinitialize the variable sum 32 to have a value of 0.

A second-level first software Application Class 1 36 is derived from the first-level first software Derived Class 1 14 and the Application Data class 30 using multiple inheritance. The Application Class 1 36 inherits the variable var1 18 and the software method setVar1 20 from the Derived Class 1 14. The Application Class 1 36 has a software definition for a software method fcn1 38 for the virtual fcn1 12 which the Application Class 1 36 inherits from the Derived Class 1 14. The software method fcn1 38 of the Application Class 1 36 is defined by two executable statements, an assignment statement 39 setting the current value of the variable sum 32 to have a value of the current value of sum 32 added to the current value of the variable var1 18, and a write statement 40 for outputting the values of the variable var1 18 and the variable sum 32.

A second-level second software Application Class 2 37 similarly is derived from the first-level second software Derived Class 2 16 and the Application Data class 30 using multiple inheritance. The Application Class 2 37 has variables var2 22 and var3 24 and software methods setVar2 26 and setVar3 28, inherited from the Derived Class 2 16. The virtual function fcn1 12 is inherited from the Derived Class 2 16 and is defined as a software method fcn1 41 having two executable statements. An assignment statement 42 sets the value of the variable sum 32 to have a value of the sum of the current value of the variable sum 32 and the product of the variable var2 22 and the variable var3 24. A write statement 43 then outputs the values of the variable var2 22, the variable var3 24 and the variable sum 32. It is to be noted that the executable code defining the software method fcn1 38 of the Application Class 1 36 is different from the executable code defining the software method fcn1 41 of the Application Class 2 37. Therefore, a call to the software method fcn1 38 results in output different from a call to the software method fcn1 41 of the Application Class 2 37. Also, all changes made to the variable sum 32 by instantiated objects of either the Application Class 1 36 or the Application Class 2 37 are recognized for subsequent references to the variable sum 32 by instantiated objects of either the Application Class 1 36 or the Application Class 2 37. It is also to be noted that if modifications are made in the code for the right hand side of the dashed line 29 of FIG. 2A, no modifications are required on the left hand side of the dashed line 29. Therefore, the DATA ANALYSIS UNIT 6 and the Derived Class 1 14 and the Derived Class 2 16 do not need to be changed. If the application environment changes, only the Application Data 30 and the Application Class 1 36 and the Application Class 2 37 along with virtual functions need to be changed.

Figure 2B:
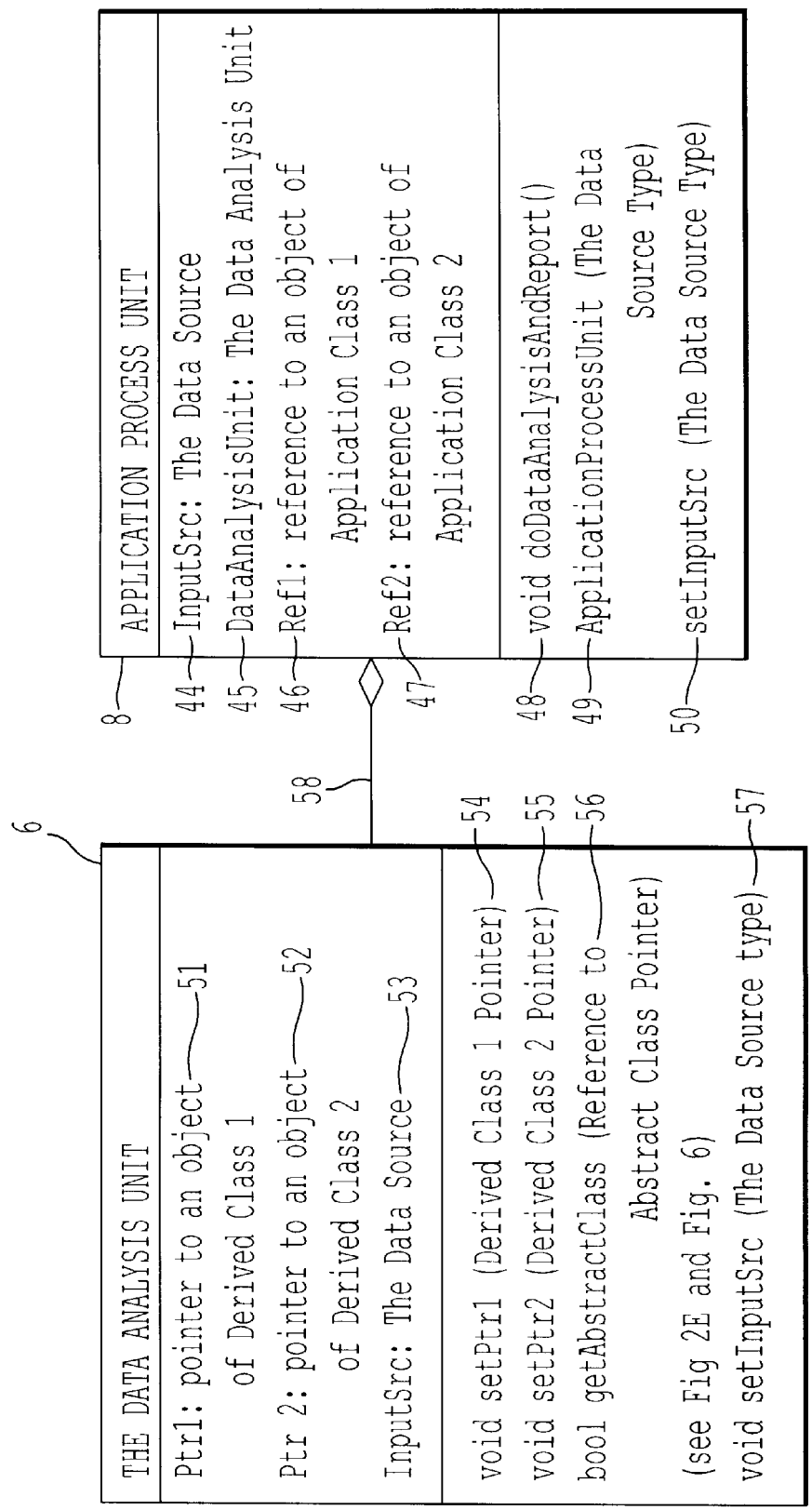
FIG. 2B is a class relationship diagram showing the class relationship between the Data Analysis Unit and the Application Process Unit.

FIG. 2B is a class relationship diagram showing the class relationship between the Data Analysis Unit 6 and the Application Process Unit 8 of FIG. 1. In the diagram, a line 58 having a diamond on the right end signifies that the Application Process Unit 8 "contains" the Data Analysis Unit 6 as explained in Fowler, M. and Scott, K.,*UML Distilled: Applying the Standard Object Modeling Language*, Addison-Wesley, Massachusetts, 1997, which is incorporated by reference herein. An input data source InputSrc 44 has type TheDataSource 140 to be discussed below with regard to FIG. 3A. A DataAnalysisUnit 45 of FIG. 2B has type TheDataAnalysisUnit 6. A variable Ref1 46 has data type pointer to an object of Application Class 1 36 of FIG. 2A. A variable Ref2 47 has data type pointer to an object of the Application Class 2 37 of FIG. 2A. Therefore, the variables Ref1 46 and Ref2 47 of FIG. 2B are each defined to point to an instantiated software object of the Application Class 1 36 and the Application Class 2 37, respectively of FIG. 2A.

A software method doDataAnalysisAndReport 48 is declared and defined in the Application Process Unit 8 of FIG. 2B and is discussed in detail below with regard to FIG. 2D and FIG. 5. The software method doDataAnalysisAndReport 48 requests that input data be analyzed and that a pointer for an appropriate software class for processing the analyzed input data be returned to the software method doDataAnalysisAndReport 48. The returned pointer is then utilized to access the inherited virtual software method fcn1 12 of FIG. 2A having an appropriate definition for an instantiated software object for processing the input data.

A software method ApplicationProcessUnit 49 of FIG. 2B is declared and defined for the Application Process Unit 8 to construct objects of the Application Process Unit class 8, to instantiate objects of the Application Class 1 36 and the Application Class 2 37 of FIG. 2A and to typecast pointers, or convert values of Ref1 46 and Ref2 47 of FIG. 2B from type pointer to an object of the Application Class 1 36 and pointer to an object of the Application Class 2 37 of FIG. 2A to type pointer to the Derived Class 1 14 and type pointer to the Derived Class 2 16, respectively. The Application Process Unit software class 8 of FIG. 2B has a software method call setInputSrc 50 sending a parameter of type The Data Source type for determining the origin of input data.

The Data Analysis Unit software class 6 of FIG. 2B has a variable Ptr1 51 declared to have type pointer to an object of the Derived Class 1 14 of FIG. 2A. A variable Ptr2 52 of FIG. 2B is declared to have type pointer to an object of the Derived Class 2 16 of FIG. 2A. A variable InputSrc 53 of FIG. 2B is declared to have a type for a data source.

The Data Analysis Unit 6 of FIG. 2B has a software method setPtr1 54 which sets the variable Ptr1 51 to a value sent to the software method setPtr1 54 as an argument in the form of a pointer to an object of the Application Class 1 36 of FIG. 2A. Similarly, a software method setPtr2 55 of FIG. 2B is declared and defined to set the variable Ptr2 52 to a value which is sent to the software method setPtr2 55 as an argument in the form of a pointer to an object of Application Class 2 37 of FIG. 2A. As a result of method calls to the setPtr1 54 and the setPtr2 55, the variables Ptr1 51 and Ptr2 52 are set to values of pointers to objects of the Application Class 1 36 and the Application Class 2 37, respectively, of FIG. 2A It is to be noted that the variables Ptr1 51 and Ptr2 52 of FIG. 2B are set to values of pointers to objects instantiated from software classes derived from the software classes which Ptr1 51 and Ptr2 52 are defined to reference.

A software method getAbstractClass 56 of FIG. 2B is defined to receive a parameter value having a type reference to a pointer to the;Abstract Class 10 of FIG. 2A. The getAbstractClass 56 of FIG. 2B is discussed in detail below with regard to FIG. 2E and FIG. 6. A software method call to the getAbstractClass 56 of FIG. 2B sends an argument of type pointer to the Abstract Class 10 of FIG. 2A. It is to be noted that the argument sent to the getAbstractClass 56 of FIG. 2B is of type pointer to the Abstract Class 10 of FIG. 2A, while the parameter for receiving the argument is of type reference to a pointer to the Abstract Class 10. The value sent to a user of the getAbstractClass 56 of FIG. 2B is a pointer to an instantiated software object of either the Application Class 1 36 or the Application Class 2 37 of FIG. 2A. The getAbstractClass 56 of FIG. 2B is of type bool, which means a value of "Yes" or "No" is returned to a user of the software method getAbstractClass 56. A software method setInputSrc 57 is defined to receive a parameter value of type The Data Source 53 for setting the data source to the value of the origin of the input data.

Figure 2C:
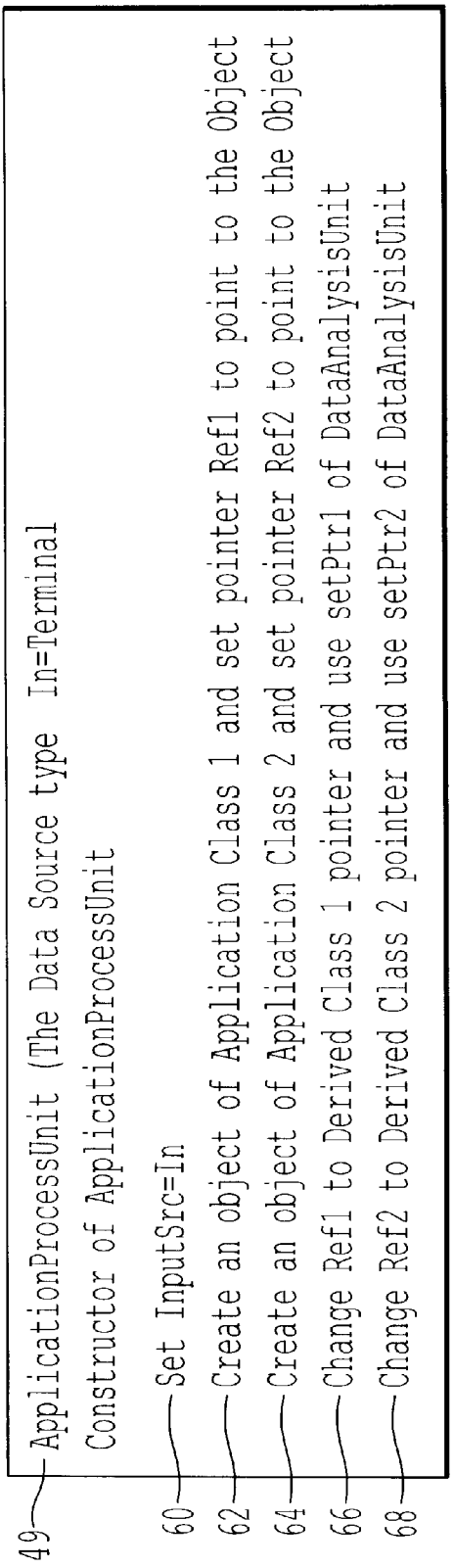
FIG. 2C illustrates a constructor of the Application Process Unit.

FIG. 2C is a constructor for the ApplicationProcessUnit 8 of FIG. 1 and FIG. 2B. The ApplicationProcessUnit constructor 49 of FIG. 2C specifies a default input source In to be "Terminal," meaning that input will be entered generally, for example on a keyboard. An assignment statement 60 sets InputSrc 44 of FIG. 2B to have a value of In, in this example meaning that the input data will be input from the "Terminal," for example a keyboard. Statement 62 of FIG. 2C then instantiates a software object of the Application Class 1 36 of FIG. 2A and sets the Ref1 46 of FIG. 2B to point to the instantiated object as discussed previously with regard to FIG. 2B.

Statement 64 of FIG. 2C then creates a software object of the Application Class 2 37 of FIG. 2A and sets the variable Ref2 47 of FIG. 2B to point to the instantiated object. Statement 66 of FIG. 2C calls the software method setPtr1 54 of FIG. 2B, sending the Ref1 46 of FIG. 2B as an argument in the form of a pointer to an instantiated software object of the Application Class 1 36 of FIG. 2A. The software method setPtr1 54 of FIG. 2B receives the value Ref1 46 in the form of a pointer to the Derived Class 1 14 of FIG. 2A and sets the variable Ptr1 51 of FIG. 2B to have the value sent by the software method call of statement 66 of FIG. 2C. The variable Ptr1 51 then has a value of a pointer to the object of Application Class 1 36 which has been created by statement 62 as discussed above with regard to FIG. 2C.

Similarly, statement 68 of FIG. 2C calls the software method setPtr2 55 of FIG. 2B, sending the Ref2 47 of FIG. 2B as an argument. The software method setPtr2 55 of FIG. 2B then receives the Ref2 47 in the form of a pointer to the Derived Class 2 16 of FIG. 2A and sets the variable Ptr2 52 of FIG. 2B to have the value sent by the software method call of statement 68 of FIG. 2C. The variable Ptr2 52 of FIG. 2B then has a value of a pointer to the software object of Application Class 2 37 of FIG. 2A which has been created by statement 64 of FIG. 2C as discussed above.

FIG. 2D is a definition of the software method doDataAnalysisAndReport 48 of the Application Process Unit 8 of FIG. 2B. The software method doDataAnalysisAndReport 48 requests that input data be analyzed and that a pointer for an appropriate software class for processing the analyzed input data be returned to the software method doDataAnalysisAndReport 48. The returned pointer is then utilized to access the inherited virtual software method fcn1 12 of FIG. 2A having an appropriate definition for an instantiated software object for processing the input data. The software method doDataAnalysisAndReport 48 of FIG. 2D has a variable localRetunPtr 72 having type pointer to the Abstract Class 10 of FIG. 2A and a variable localOK 74 of type bool. Statement 76 of FIG. 2D calls the software method setInputSrc 57 of the DataAnalysisUnit 6 of FIG. 2B, sending an argument having the value of InputSrc, which has been set to reference "Terminal," for example keyboard input by statement 60 of the ApplicationProcessUnit 49 as discussed previously with regard to FIG. 2C. Statement 78 of FIG. 2D uses the Ref1 46 of FIG. 2B, referencing a software object of the Application Class 1 36 of FIG. 2A, to execute the inherited software method reset 34 of FIG. 2A to set the static variable sum 32 to a value of 0.

Statement 80 of FIG. 2D then sets the variable localOK 74 to have a value of "Yes" or "No", depending on the value returned from a call to the software method getAbstractClass 56 of the Data Analysis Unit 6 of FIG. 2B. The software method getAbstractClass 56 is discussed in detail below with regard to FIG. 2E. The statement 80 of FIG. 2D calls the software method getAbstractClass 56 sending an argument in the form of a pointer to the Abstract Class 10 of FIG. 2A. The software method getAbstractClass 56 retrieves and analyzes data from the data source to send a pointer value for accessing an appropriate instantiated software object for processing the input data. If the data is recognized to be the end of file, the argument pointer is set to 0 and a value of "Yes" is returned to be assigned to the variable localOK 74 in the statement 80 of FIG. 2D. If the input data is instead determined to be data of a type for the Derived Class 1 14 of FIG. 2A, the variable var1 18 is set to have the data value and the argument pointer is set to have the value of Ptr1 51 of FIG. 2B, and a value of "Yes" is returned to be assigned to the variable localOK 74 in the assignment statement 80 of FIG. 2D. If it is determined that the input data is of a type for the Derived Class 2 16 of FIG. 2A, the value of the variable Ptr2 52 of FIG. 2B is used to access the software methods setVar2 26 and setVar3 28 of FIG. 2A, respectively to set the variables var2 22 and var3 24 to have values from the input data. The argument pointer is then set to have a value of the pointer Ptr2 52 of FIG. 2B and a value of "Yes" is returned to be assigned to the variable localOK 74 in the assignment statement 80 of FIG. 2D. Otherwise the argument pointer is set to have a value of 0 and a value of "No" is returned to be assigned to the variable localOK 74 in the assignment statement 80 of FIG. 2D.

Statement 82 of FIG. 2D determines whether the value of the variable localReturnPtr 72 is zero. If it is determined that the value of localReturnPtr 72 is not zero, then statement 84 uses the value of the variable localReturnPtr 72, which is of type pointer to the Abstract Class 10 of FIG. 2A, to access and execute the software method fcn1 12 defined for an instantiated software object either for the Application Class 1 36 or the Application Class 2 37 of FIG. 2A, depending on the value currently in the variable localReturnPtr 72 of FIG. 2D. It is to be noted that the software method doDataAnalysisAndReport 48 has no knowledge of which definition of the software method fcn1 12 of FIG. 2A is being executed by the generic software method call localReturnPtr→fcn1 of statement 84 of FIG. 2D. The referenced software object is made specific by the value passed by the software method getAbstractClass 56 of FIG. 2B. Since the selected software object is accessed by using only the pointer and the software method name "fcn1" which is common to all instantiated software objects which are candidates for access, the interface eliminates the need for programmers to write code having unique names for each instantiated software object for accessing selected software object methods. This feature offers a significant savings in software programming and maintenance time and resources.

Statement 86 of FIG. 2D is an assignment statement having a call to the software method getAbstractClass 56 of the DataAnalysisUnit 6 of FIG. 2B, having an argument pointer of type pointer to the Abstract Class 10 of FIG. 2A, returning a value of "Yes" or "No" for assignment to the localOK 74 of FIG. 2D. The assignment statement 86 of FIG. 2D has the same steps in execution as the statement 80 discussed above.

Control is then returned to statement 82 of FIG. 2D. If it is determined that the value of the variable localReturnPtr 72 is zero, control passes to statement 88 of FIG. 2D. Statement 88 determines if the value of the variable localOK 74 is "Yes" or "No". If it is determined that the variable localOK 74 has a value of "No", an error routine 90 is called. If it is determined that the value of the variable localOK 74 has a value of "Yes", control is returned to the user of the software method doDataAnalysisAndReport 48.

FIG. 2E is a definition of the software method getAbstractClass 56 which is declared and defined for the Data Analysis Unit 6 of FIG. 2B. The getAbstractClass 56 inputs data from an input data source, determines a data type for the input data, and sends to the user of the getAbstractClass 56 a pointer to a software object for processing the data type of the input data. The getAbstractClass 56 has a parameter AbPtr 101 of type reference to a pointer of a software object of the Abstract Class 10 of FIG. 2A. Statement 102 of FIG. 2E gets data from a data input source. Statement 104 determines if the data is the end of the input file. If it is determined that the data is the end of the input file then statement 106 sets the parameter AbPtr 101 to have a value of 0 and statement 108 returns a value of "Yes" to the user of the software method getAbstractClass 56.

If it is determined that the data is not the end of the input file, then statement 110 determines if the input data is of a type for the Derived Class 1 14 of FIG. 2A. If it is determined that the input data contains data of a type for the Derived Class 1 14, then statement 112 of FIG. 2E uses the value of the variable Ptr1 51 of FIG. 2B to execute the inherited software method setVar1 20 for an instantiated object of the Application Class 1 36 of FIG. 2A to set the variable var1 18 to have a value of the input data. Statement 114 of FIG. 2E then sets the parameter AbPtr 101 to have a value of the variable Ptr1 51 of FIG. 2B. It is to be noted that the AbPtr 101 of FIG. 2E is of type reference to a pointer to the Abstract Class 10 and that the Ptr1 51 of FIG. 2B is of type pointer to an object of the Derived Class 1 51 of FIG. 2A, the Ptr1 51 of FIG. 2B having a value of a pointer to an instantiated software object of the Application Class 1 36 of FIG. 2A as discussed above with regard to FIG. 2C. Statement 116 of FIG. 2E then returns a value of "Yes" to the user of the software method getAbstractClass 56.

If it is determined that the input data does not contain data of the type Derived Class 1 14 of FIG. 2A, then statement 118 of FIG. 2E determines if the input data contains data of a type for the Derived Class 2 16 of FIG. 2A. If it is determined that the input data contains data of a type for the Derived Class 2 16 of FIG. 2A, then statement 120 of FIG. 2E uses the variable Ptr2 52 of FIG. 2B to access the inherited software method setVar2 26 for an instantiated software object of the Application Class 2 37 of FIG. 2A. Similarly, statement 122 of FIG. 2E uses the variable Ptr2 52 of FIG. 2B to access the software method setVar3 28 of FIG. 2A to set the variables var2 22 and var3 24, respectively to input data values. An assignment statement 124 of FIG. 2E then sets the parameter AbPtr 101 to have the value of the variable Ptr2 52 of FIG. 2B as similarly discussed above with regard to statement 114 of FIG. 2E. Statement 126 then returns a value of "Yes" to the user of the software method getAbstractClass 56. If it is determined that the input data does not contain data of type Derived Class 2 16 of FIG. 2A, then an assignment statement 128 of FIG. 2E sets the parameter AbPtr 101 to have a value of 0 and statement 130 returns a value of "No" to the user of the software method getAbstractClass 56.

Figure 3A:
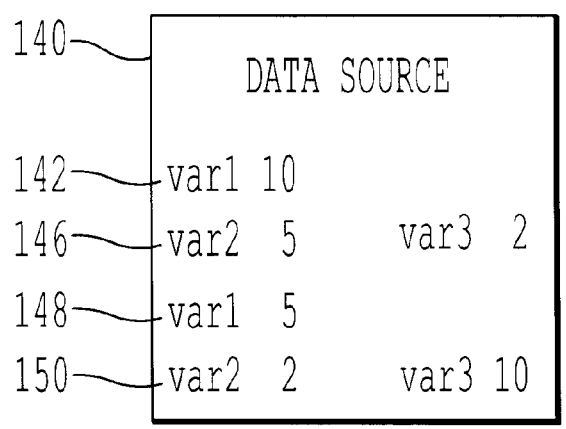
FIG. 3A shows an exemplary Data Source for sample input data.

FIG. 3A illustrates the Data Source 140 of exemplary data to be input. Line 142 has an input value of 10 for the variable var1 18 of the Derived Class 1 14 of FIG. 2A. Line 146 of FIG. 3A has a value of 5 for the variable var2 22 and a value of 2 for the variable var3 24 of the Derived Class 2 16 of FIG. 2A. Line 148 of FIG. 3A has a value of 5 for the variable var1 18 of the Derived Class 1 14 of FIG. 2A. Line 150 of FIG. 3A has a value of 2 for the variable var2 22 and a value of 10 for the variable var3 24 of the Derived Class 2 16 of FIG. 2A. These data values are input a line at a time by statement 102 of the software method getAbstractClass 56 as discussed previously with regard to FIG. 2E.

Figure 3B:
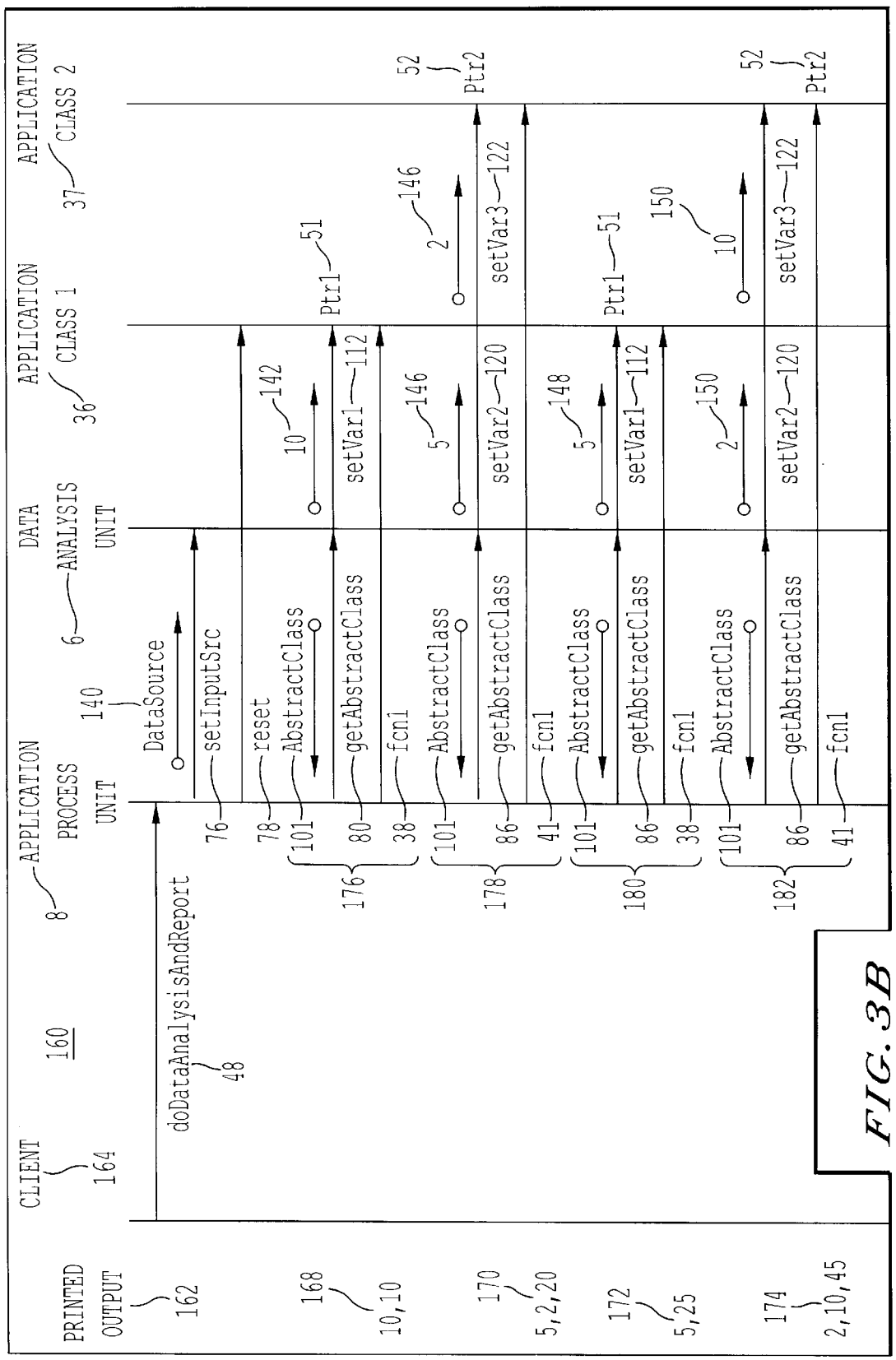
FIG. 3B is a message diagram showing messages passed between the Application Process Unit and the Data Analysis Unit.

FIG. 3B is a message diagram showing the messages passed among a Client 164, the Application Process Unit 8 of FIG. 1, the Data Analysis Unit 6, the Application Class 1 36 of FIG. 2A, and the Application Class 2 37. A Printed Output 162 of FIG. 3B illustrates the output generated by the write statement 43 of the Application Class 2 37 of FIG. 2A and the write statement 40 of the Application Class 1 36 as the messages are passed among the software objects.

In FIG. 3B, solid arrows from left to right signify that a user shown at the top of the vertical line at the origin (the left end) of the arrow generates a call to a software method which is defined for the software object above the solid vertical line at the destination end (the right end) of the arrow. Arrows with circles on the origin end signify messages, or information either sent to or from the called software methods as a result of the software method calls as signified by the solid arrows immediately below the arrows with circles in FIG. 3B. The output lines under the Printed Output 162 show the corresponding output generated by the calls to the software messages which are on the same abstract horizontal level as the output line in FIG. 3B. The information is received by the software object at the top of the vertical line at the destination end of the arrow. In FIG. 3B, references to "Ptr1 51" and "Ptr2 52" show that the values of the pointer variables Ptr1 51 and Ptr2 52 of FIG. 2B are being used by the Data Analysis Unit 6 after a determination is made of the type of data which has been input. Flow of execution is generally from top to bottom, left to right in FIG. 3B. Braces signify repetitious or iterating steps for inputting a next input data line, processing the data, and outputting the result. The message diagram 160 of FIG. 3B is illustrated to show the flow of execution and output for the example described previously with regard to FIGS. 1–3A.

The Client 164 of FIG. 3B calls the software method doDataAnalysisAndReport 48 of the Application Process Unit 8, discussed previously with regard to FIGS. 2B and 2D. Statement 76 of the software method doDataAnalysisAndReport 48 of FIG. 2D calls the software method setInputSrc 57 of the Data Analysis Unit 6 of FIG. 2B, sending an argument InputSrc 44, which sets the input data source to the Data Source 140 of FIG. 3A. Statement 78 of the software method doDataAnalysisAndReport 48 of FIG. 2D then uses the Ref1 46 of the Application Process Unit 8 of FIG. 2B to execute the reset software method 34 inherited by the software object instantiated for the Application Class 1 36 of FIG. 2A in statement 62 of FIG. 2C, to set the static variable sum 32 of FIG. 2A to a value of 0. As a result, an interface is thereby initialized for processing input data.

A brace 176 signifies a first iteration for inputting input data, analyzing the input data to determine a data type of the input data, and processing the input data to write out output under the Printed Output 162. Statement 80 of FIG. 3B, which corresponds to the statement 80 of FIG. 2D, calls the software method getAbstractClass 56 of FIG. 2E of the Data Analysis Unit 6 of FIG. 3B, which corresponds to the Data Analysis Unit 6 of FIG. 2B. Statement 102 of the getAbstractClass 56 of FIG. 2E then gets input data, a value of 10 for the var1 18 of FIG. 2A, from line 142 of the Data Source 140 of FIG. 3A. Statement 110 of FIG. 2E then determines that the input data contains data of type Derived Class 1 14 of FIG. 2A. A call to the software method setVar1 112 of FIG. 3B corresponds to the statement 112 of FIG. 2E, using the value of the Ptr1 51 of FIG. 2B, a value of a pointer to the instantiated object of the Application Class 1 36 of FIG. 2A, to access the inherited software method setVar1 20 of FIG. 2A to set the variable var1 18 to the value of 10 input from the line 142 of FIG. 3A.

Statement 114 of FIG. 2E sets the parameter AbPtr 101, of type reference to the Abstract Class 10 of FIG. 2A, to have a value of the variable Ptr1 51 of FIG. 2B, which is a value of a pointer to the instantiated software object of the Application Class 1 36 of FIG. 2A. Statement 116 of FIG. 2E then returns a value of "Yes" to the software method doDataAnalysisAndReport 48 of the Application Process Unit 8 of FIG. 2D so that statement 80 assigns a value of "Yes" to the variable localOK 74. The parameter Abptr 101 of FIG. 2E is returned as an Abstract Class pointer 101 shown in FIG. 3B.

Statement 82 of FIG. 2D then determines that the pointer localReturnPtr 72 is not zero. Statement 84 then uses the value of the pointer localReturnPtr 72, currently a value of a pointer to the instantiated software object of the Application Class 1 36 of FIG. 2A, to access the inherited software method fcn1 38 of FIG. 3B, which corresponds to the fcn1 38 of FIG. 2A. Statement 39 then adds the current value of the variable var1 18, a value of 10, to the value of sum 32, currently having a value of 0, to set the sum 32 to have a value of 10. Statement 40 then writes the value of var1 18 and sum 32 to generate line 168 showing two values of 10 for the Printed Output 162 of FIG. 3B, thereby completing execution of the steps included for the brace 176 of FIG. 3B.

A brace 178 of FIG. 3B signifies the steps executed to input and process the second line 146 of input data of FIG. 3A. Statement 86 of FIG. 3B, shown within the brace 178, corresponds to the statement 86 of FIG. 2D and calls the software method getAbstractClass 56 of the Data Analysis Unit 6 of FIG. 3B, which corresponds to the Data Analysis Unit 6 of FIG. 2E, passing the argument localReturnPtr 72 which has type pointer to the Abstract Class 10 of FIG. 2A. Statement 102 of FIG. 2E then gets input data, values of 5 for the var2 22 and 2 for the var3 24 of FIG. 2A, from line 146 of the Data Source 140 of FIG. 3A. Statement 118 of FIG. 2E then determines that the data of line 146 of FIG. 3A contains data of type Derived Class 2 16 of FIG. 2A. Statement 120 of FIG. 3B, which corresponds to the statement 120 of FIG. 2E, then uses the variable Ptr2 52 of FIG. 3B, which corresponds to the Ptr2 52 of the Data Analysis Unit 6 of FIG. 2B, to access the inherited software method setVar2 26 of the software object instantiated for the Application Class 2 37 FIG. 2A by statement 64 of FIG. 2C to set the variable var2 22 of FIG. 2A to have a value of 5 from the line 146 of FIG. 3A. Similarly, statement 122 of FIG. 3B, which corresponds to the statement 122 of FIG. 2E, uses the variable Ptr2 52 of FIG. 2B to access the software method setVar3 28 of FIG. 2A to set the variable var3 24 to a value of 2 from the line 146 of FIG. 3A. Statement 124 of FIG. 2E then sets the parameter AbPtr 101, which corresponds to the parameter Abstract Class 101 of FIG. 3B, to have a value of the Ptr2 52 of FIG. 2B, currently a value of a pointer to the instantiated software object of the Application Class 2 37 of FIG. 2A. Statement 126 of FIG. 2E then returns a value of "Yes" to be assigned to the variable localOK 74 in the statement 86 of FIG. 2D. The argument localReturnPtr 72 then has a value of a pointer to the instantiated software object of the Application Class 2 37 of FIG. 2A.

Statement 82 of FIG. 2D then determines that the value of the localReturnPtr 72 is not zero. Statement 84 then uses the value of the variable localReturnPtr 72 to access the inherited software method fcn1 41 of FIG. 3B, which corresponds to the fcn1 41 of the instantiated software object of the Application Class 2 37 of FIG. 2A. Statement 42 then adds the product of the values of the variables var2 22 and var3 24, which are 5 and 2, respectively, to the current value of the sum 32, which is 10, to assign a value of 20 to the variable sum 32. Statement 43 then writes the values of the variables var2 22, var3 24, and sum 32, values of 5, 2 and 20, respectively to line 170 of the Printed Output 162 of FIG. 3B, thereby completing execution of the steps included for the brace 178 of FIG. 3B.

A brace 180 of FIG. 3B signifies the steps executed to input and process the third line 148 of input data of FIG. 3A. Statement 86 within the brace 180 of FIG. 3B, which corresponds to the statement 86 of FIG. 2D, calls the software method getAbstractClass 56 of FIG. 2E, passing the argument localReturnPtr 72 which has type pointer to the Abstract Class 10 of FIG. 2A. Statement 102 of FIG. 2E then gets input data, a value of 5 for the var1 18 of FIG. 2A, from line 148 of the Data Source 140 of FIG. 3A. Statement 110 of FIG. 2E determines that the input data contains data of a type for the Derived Class 1 14 of FIG. 2A. Statement 112 of FIG. 3B, which corresponds to the statement 112 of FIG. 2E, uses the value of the Ptr 1 51 of FIG. 3B, which corresponds to the Ptr 1 51 of FIG. 2B, to execute the inherited software method setVar1 20 of the instantiated software object of the Application Class 1 36 of FIG. 2A to set the value of the variable var1 18 to have a value of 5 from the line 148 of FIG. 3A. Statement 114 of FIG. 2E sets the parameter AbPtr 101 which has type reference to the Abstract Class 10 of FIG. 2A, shown as an Abstract Class reference 101 of FIG. 3B, to have a value of the variable Ptr1 51 of FIG. 2B, of type pointer to the Application Class 1 36 of FIG. 2A. Statement 116 of FIG. 2E then returns a value of "Yes" to the software method DataAnalysisAndReport 48 of FIG. 2D so that statement 86 assigns a value of "Yes" to the variable localOK 74 and the value of the Ptr1 51 of FIG. 2B is returned for the parameter AbPtr 101 of FIG. 2E, shown as an Abstract Class reference 101 of FIG. 3B.

Statement 82 then determines that the pointer localReturnPtr 72 is not zero. Statement 84 then uses the value of the pointer localReturnPtr 72, currently a value of a pointer to the instantiated software object of the Application Class 1 36 of FIG. 2A, to access the inherited software method fcn1 38 of FIG. 3B, which corresponds to the fcn 1 38 of FIG. 2A. Statement 39 then adds the current value of the variable var1 18, a value of 5, to the value of sum 32, currently having a value of 20 to set the sum 32 to have a value of 25. Statement 40 then writes the value of var1 18 and sum 32 to generate line 172 of FIG. 3B showing a value of 5 for the variable var1 18 of FIG. 2A and a value of 25 for the variable sum 32 for the Printed Output 162 of FIG. 3B, thereby completing execution of the steps included for the brace 180 of FIG. 3B.

A brace 182 of FIG. 3B signifies the steps executed to input and process the fourth line 150 of input data of FIG.

3A. Statement 86 of FIG. 3B, which corresponds to the statement 86 of FIG. 2D, calls the software method getAbstractClass 56 of FIG. 2E, passing the argument localReturnPtr 72 which has type pointer to the Abstract Class 10 of FIG. 2A. Statement 102 of FIG. 2E then gets input data, values of 2 for the var2 22 and 10 for the var3 24 of FIG. 2A, from line 150 of the Data Source 140 of FIG. 3A. Statement 118 of FIG. 2E then determines that the input data of line 150 of FIG. 3A contains data of a type for the Derived Class 2 16 of FIG. 2A. Statement 120 of FIG. 3B, which corresponds to the statement 120 of FIG. 2E then uses the variable Ptr2 52 of the Data Analysis Unit 6 of FIG. 3B, which corresponds to the Data Analysis Unit 6 of FIG. 2B, to access the inherited software method setVar2 26 for the instantiated software object of the Application Class 2 37 of FIG. 2A to set the variable var2 22 to have a value of 2 from line 150 of FIG. 3A. Similarly, statement 122 of FIG. 3B, which corresponds to the statement 122 of FIG. 2E, uses the variable Ptr2 52 of FIG. 3B which corresponds to the Ptr2 52 of FIG. 2B to access the inherited software method setVar3 28 of FIG. 2A to set the variable var3 24 to have a value of 10 from the line 150 of FIG. 3A.

Statement 124 of FIG. 2E then sets the parameter AbPtr 101, shown as an AbstractClass parameter 101 in FIG. 3B, to have a value of the Ptr2 52 of FIG. 2B, which is a value of a pointer to the instantiated software object of the Application Class 2 37 of FIG. 2A. Statement 126 of FIG. 2E then returns a value of "Yes" to be assigned to the variable localOK 74 in the statement 86 of FIG. 2D. The argument localReturnPtr 72 then has a value of a pointer to the instantiated software object of the Application Class 2 37 of FIG. 2A, as returned by the parameter shown as the AbstractClass 101 of FIG. 3B. It is to be noted that the localReturnPtr 72 of FIG. 2D is of type pointer to the Abstract Class 10 of FIG. 2A.

Statement 82 of FIG. 2D then determines that the value of the localReturnPtr 72 is not zero. Statement 84 then uses the value of the variable localReturnPtr 72 to access the inherited software method fcn1 41 of FIG. 3B; which corresponds to the fcn1 41 of the instantiated software object of the Application Class 2 37 of FIG. 2A. Statement 42 then adds the product of the values of the variables var2 22 and var3 24, values of 2 and 10, respectively, to the current value of sum 32, which is 25, to assign a value of 45 to the variable sum 32. Statement 43 then writes the values of the variables var2 22, var 3, 24, and sum 32, values of 2, 10 and 45 respectively, to line 174 of the Printed Output 162 of FIG. 3B, thereby completing execution of the steps included for the brace 182 of FIG. 3B.

Figure 4:
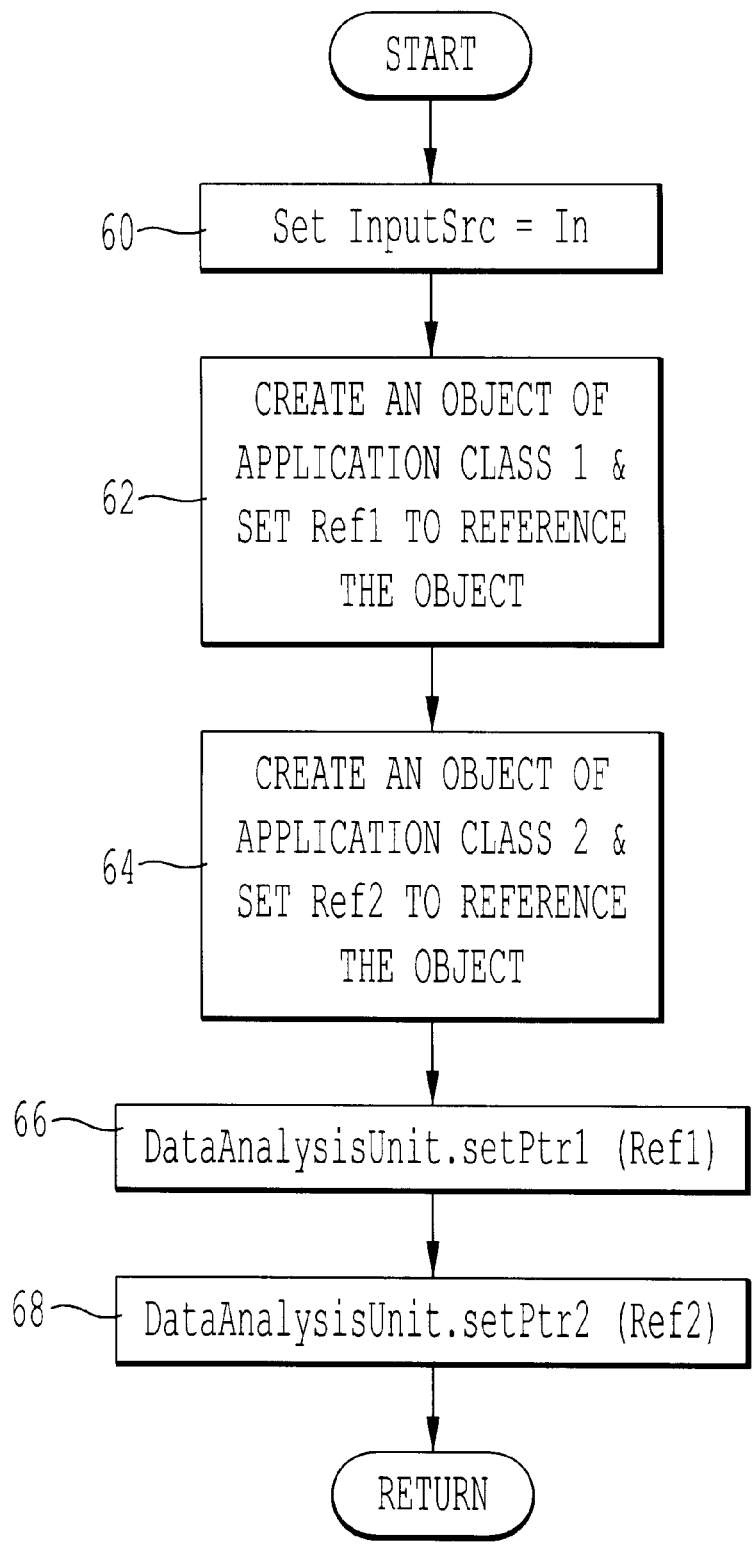
FIG. 4 is a flowchart for the constructor of the ApplicationProcessUnit.

FIG. 4 is a flowchart showing the logical flow of the constructor for the ApplicationProcessUnit 8 of FIG. 1 and FIG. 2B, as discussed previously with regard to FIG. 2C. FIG. 4 has the same steps and reference numerals as FIG. 2C. After starting, step 60 assigns a value of In to InputSrc 44, in this case meaning that input data will be input from, for example a keyboard. Step 62 then instantiates a software object of the Application Class 136 of FIG. 2A and sets the pointer Ref1 46 of FIG. 2B to point to the instantiated object.

Step 64 then instantiates a software object of the Application Class 2 37 of FIG. 2A and sets the variable Ref2 47 of FIG. 2B to point to the instantiated object. Step 66 then calls the software method setPtr1 55 of the Data Analysis Unit 6 of FIG. 2B, sending the value of the pointer variable Ref1 46 cast as an argument having a type pointer to the Derived Class 1 14 of FIG. 2A. It is to be noted that the variable Ref1 46 of FIG. 2B is of type pointer to an instantiated object of the Application Class 1 36 of FIG. 2A.

The software method setPtr1 54 of FIG. 2B then sets the variable Ptr1 51 to have the value sent by the software method call of step 66 of FIG. 4. Similarly, step 68 of FIG. 4 then calls the software method setPtr2 55 of the Data Analysis Unit 6 of FIG. 2B, sending as an argument the Ref1 46, cast as a pointer to an instantiated software object of the Derived Class 2 16 of FIG. 2A. The software method setPtr2 55 of FIG. 2B then sets the value of the variable Ptr2 52 to have the value of the pointer passed by the step 68 of FIG. 4 which is a value of a pointer to the instantiated software object of the Application Class 2 37 of FIG. 2A.

Figure 5:
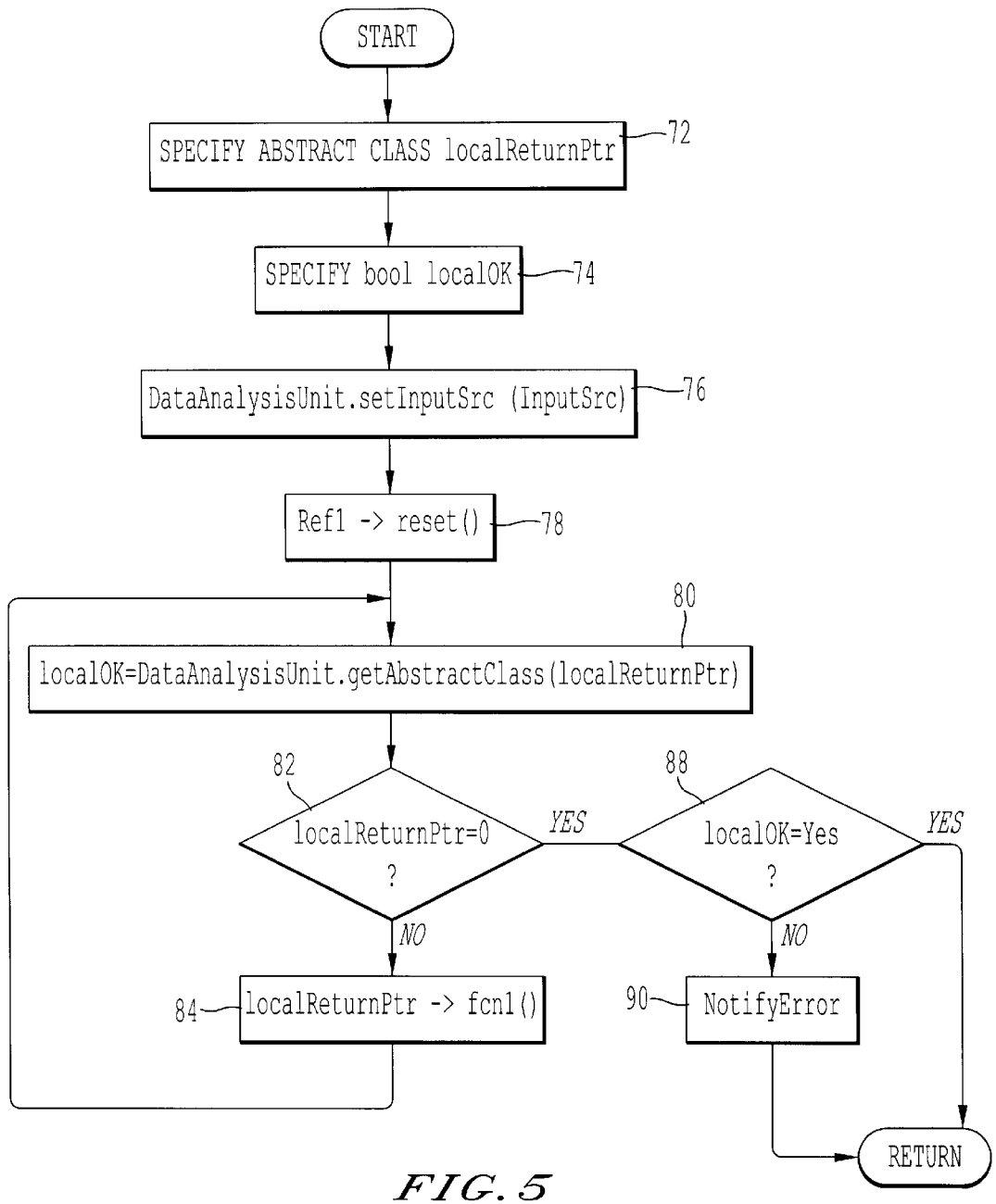
FIG. 5 is a flowchart for the doDataAnalysisAndReport software method.

FIG. 5 is a flowchart showing the logical flow for the software method doDataAnalysisAndReport 48 of FIG. 2D. The software method doDataAnalysisAndReport 48 requests that input data be analyzed and that a pointer for an appropriate software object for processing the analyzed input data be returned to the software method doDataAnalysisAndReport 48. The returned pointer is then utilized to access the inherited virtual software method fcn1 12 of FIG. 2A having an appropriate definition for an instantiated software object for processing the input data.

FIG. 5 has the same steps and reference numerals as FIG. 2D discussed previously. After starting, step 72 of FIG. 5 declares the variable localReturnPtr to have type pointer to the Abstract Class 10 of FIG. 2A. Step 74 of FIG. 5 declares the variable localOK to be of type bool. Step 76 of FIG. 5 calls the software method setInputSrc 57 of the DataAnalysisUnit 6 of FIG. 2B, sending an argument having the value of InputSrc 44 of FIG. 2B. Step 78 then uses the pointer variable Ref1 46 of FIG. 2B, having a value of a pointer to the instantiated software object of the Application Class 1 36 of FIG. 2A to access the inherited software method reset 34 of the instantiated software object of the Application Class 1 36 to set the static variable sum 32 to have a value of 0.

Step 80 of FIG. 5 then sets the variable localOK 74 to have a value of "Yes" or "No", depending on the value returned from a call to the software method getAbstractClass 56 as discussed previously with regard to FIG. 2E. The software method getAbstractClass 56 is sent an argument of type pointer to the Abstract Class 10 of FIG. 2A. The software method getAbstractClass 56 retrieves and analyzes data from the data input source and returns a parameter of type reference to a pointer to the Abstract Class 10 of FIG. 2A, as discussed previously with regard to FIG. 2E.

Step 82 of FIG. 5 determines whether the value of the variable localReturnPtr 72 is 0. If it is determined that the value of localReturnPtr 72 is not 0, then step 84 uses the value of the variable localReturnPtr 72, which is a pointer to the Abstract Class 10 of FIG. 2A to access an inherited software method fcn1 12 for an instantiated software object as defined by either the Application Class 1 36 or the Application Class 2 37, depending on the value currently in the variable localReturnPtr 72 of FIG. 5. It is to be noted that the software method doDataAnalysisAndReport 48 of FIG. 5 has no knowledge of which definition of the software method fcn1 12 of FIG. 2A is accessed by the call to the software method of step 84 of FIG. 5. Control then passes to step 80 as an iterating step.

If step 82 determines that the value of localReturnPtr 72 is 0, control passes to step 88 of FIG. 5. Step 88 determines if the value of the variable localOK 74 is "Yes" or "No". If it is determined that the variable localOK 74 has a value of "No", step 90 calls an error routine, as the input data was neither determined to be the end of the input file nor of a type for the Derived Class 1 14 or the Derived Class 2 16 of FIG. 2A, and control is returned to the system. If it is determined that the value of the variable localOK 74 has a value of "Yes", control is returned to the system.

Figure 6:
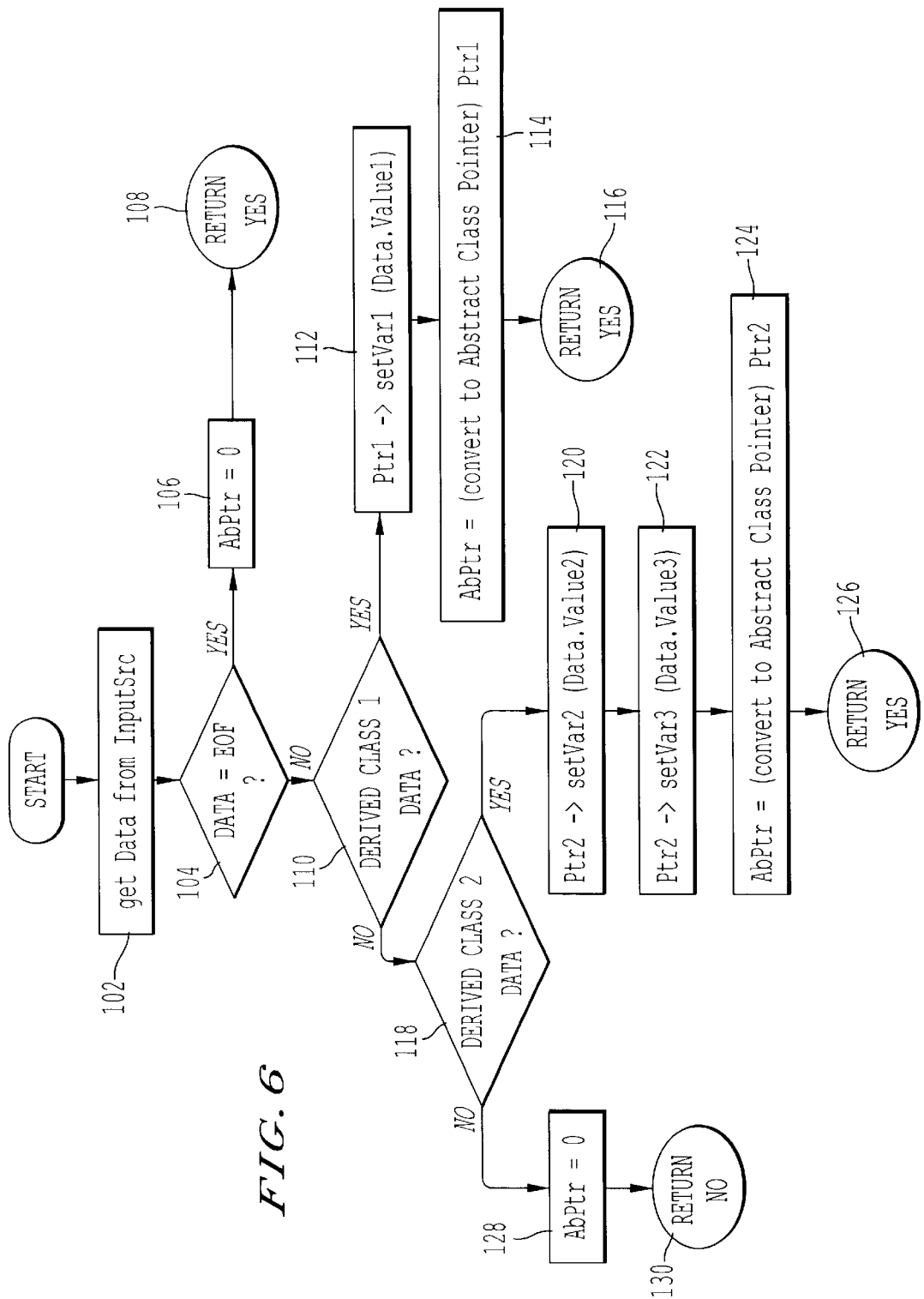
FIG. 6 is a flowchart for the getAbstractClass software method.

FIG. 6 is a flowchart showing the logical flow of the software method getAbstractClass 56 which was discussed previously with regard to FIG. 2E and FIG. 2B. The getAbstractClass 56 gets data from an input data source, determines a data type for the input data, and sends to the user of the getAbstractClass 56 a pointer to a software object for processing the data type of the input data. FIG. 6 has the same steps and reference numerals as FIG. 2E. After starting, step 102 gets input data from a data input source. Step 104 then determines if the input data is the end of the input file.

If it is determined that the input data is the end of the input file then step 106 sets the parameter AbPtr 101 of FIG. 2E to have a value of 0, and step 108 of FIG. 6 returns a value of "Yes" to the user of the software method getAbstractClass 56. If it is determined that the input data is not the end of the input file, then step 110 determines if the input data is of a type for the Derived Class 1 14 of FIG. 2A. If it is determined that the input data is of a type for the Derived Class 1 14, then step 112 of FIG. 6 uses the value of the variable Ptr1 51 of FIG. 2B to access the inherited software method setVar1 20 of the instantiated software object of the Application Class 1 36 of FIG. 2A to set the variable var1 18 to have a value of the input data. Step 114 of FIG. 6 then sets the parameter AbPtr 101 to have a value of the variable Ptr1 51 of FIG. 2B, casting the value from type pointer to the Derived Class 1 14 of FIG. 2A to type pointer to the Abstract Class 10. Step 116 of FIG. 6 then returns a value of "Yes" to the user of the software method getAbstractClass 56.

If it is determined that the input data does not contain data of a type for the Derived Class 1 14 of FIG. 2A, then step 118 of FIG. 6 determines if the input data contains data of a type for the Derived Class 2 16 of FIG. 2A. If it is determined that the input data contains data of a type for the Derived Class 2 16, then step 120 of FIG. 6 uses the variable Ptr2 52 of FIG. 2B to access the inherited software method setVar2 26 of the instantiated software object of the Application Class 2 37 of FIG. 2A and step 122 of FIG. 6 similarly uses the variable Ptr2 52 of FIG. 2B to access the inherited software method setVar3 28 of FIG. 2A to set the values of the variables var2 22 and var3 24, respectively to input data values. Step 124 of FIG. 6 then sets the parameter AbPtr 101 to have the value of the variable Ptr2 52 of FIG. 2B and step 126 of FIG. 6 then returns a value of "Yes" to the user of the software method getAbstractClass 56. If it is determined that the input data does not contain data of a type for the Derived Class 2 16 of FIG. 2A, then step 128 of FIG. 6 sets the parameter AbPtr 101 to have a value of 0 and step 130 returns a value of "No" to the user of the software method getAbstractClass 56.

Figure 7:
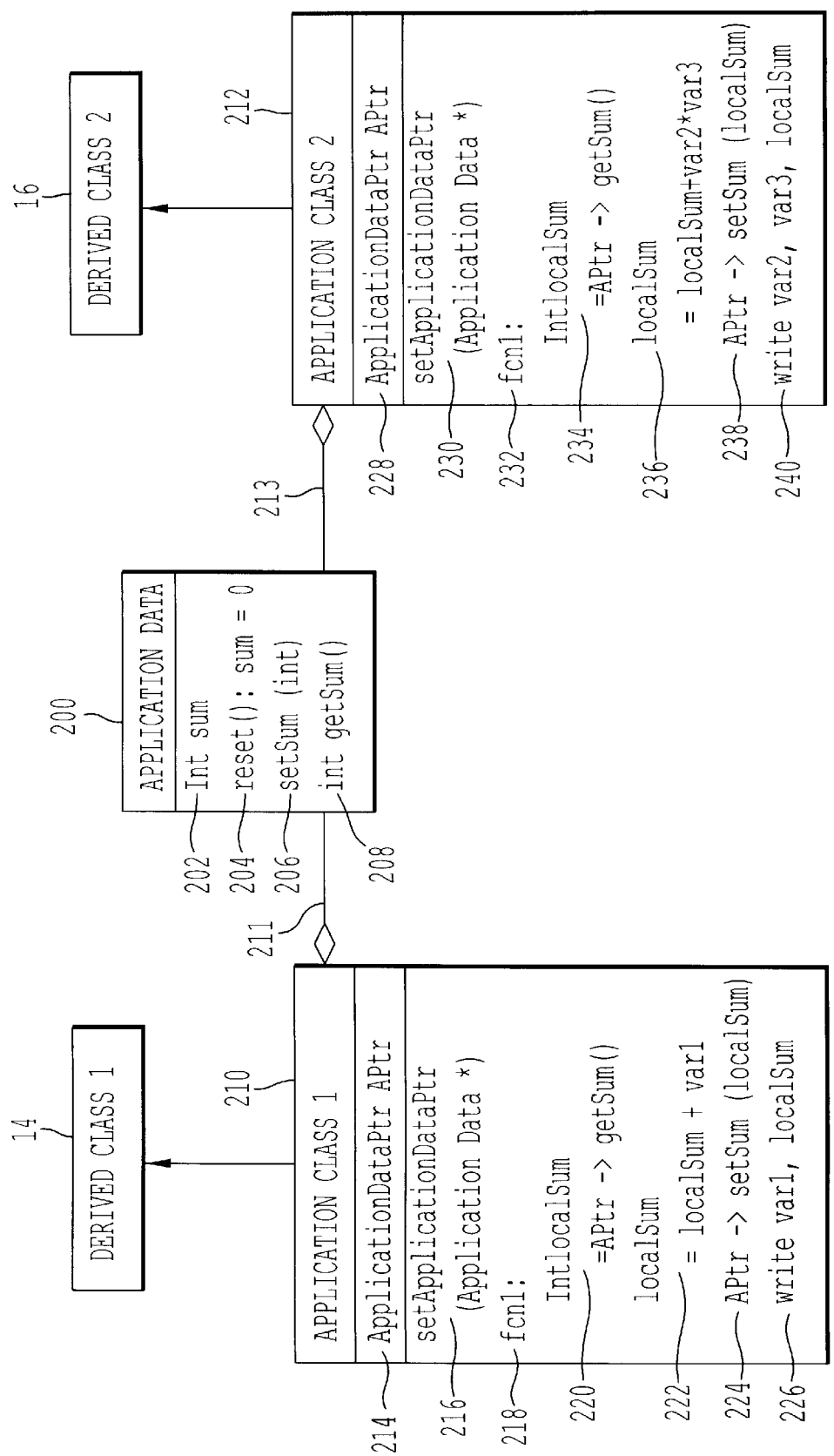
FIG. 7 is a class relationship diagram for an alternative design of the Application Process Unit.

FIG. 7 is a class relationship diagram for an alternate design of the Application Process Unit 8 of FIG. 1 and FIG. 2A. In this design, multiple inheritance is not used. The derived Class 1 14 and the Derived Class 2 16 of the Data Analysis Unit 6 were discussed previously with regard to FIG. 2A. An Application Data software class 200 of FIG. 7 has a variable sum 202 having type integer. A software method reset 204 is defined to set the variable sum 202 to a value of 0. A software method setSum 206 is defined to accept a parameter value having type integer to assign to the variable sum 202. A software method getSum 208 is defined to pass the current value of the variable sum 202 to a calling routine.

An Application Class 1 210 is derived from the Derived Class 1 14 and contains the Application Data Class 200. An Application Class 2 212 is derived from the Derived Class 2 16 and contains the Application Data Class 200.

The Application Class 1 210 has a pointer variable APtr 214 of type pointer to the Application Data software class 200 for referencing objects instantiated for the Application Data software class 200. A software method setApplicationDataPtr 216 is defined to send the pointer variable APtr 214 to a user of the software method setApplicationDataPtr 216 to have the Aptr 215 set to a value of a pointer to an instantiated object of the Application Data software class 200. The software method fcn1 218 is inherited from the Derived Class 1 14 similarly to the fcn1 38 discussed previously with regard to FIG. 2A. A software method fcn1 218 of FIG. 7 is defined to have a local variable localSum 220 which is initialized by using the pointer variable APtr 214 to access the software method getSum 208 of an instantiated software object of the Application Data software class 200. The variable localSum 220 will then be set to the current value of sum 202 for each call to the software method fcn1 218 by a user. Therefore, the variable localSum 220 has a copy of the value of the variable sum 202 after a call to getSum 208. Similarly to the assignment statement 39 of FIG. 2A, an assignment statement 222 of FIG. 7 then adds the value of the inherited variable var1 18 of FIG. 2A to the value of the localSum 220 of FIG. 7, storing the result in the variable localSum 220. A software method call 224 uses the value of the variable APtr 214 to access the software method setSum 206 to set the variable sum 202 to have a value of the variable localSum 220. Therefore, the variable sum 202 has a copy of the value of the variable localSum 220 after a call to setSum 206 by the Application Class 1 210. A write statement 226 then outputs the values of the variable var1 18 and the variable localSum 220, similarly to the write statement 40 of FIG. 2A.

Similarly to the Application Class 1 210 of FIG. 7, the Application Class 2 212 has a variable APtr 228 having type pointer to an instantiated software object of the Application Data software class 200. A software method setApplicationDataPtr 230 sets the variable APtr 228 to have a value of a pointer to an instantiated software object of the Application Data software class 200, as discussed previously with regard to the call setApplicationDataPtr 216 of the Application Class 1 210. The values of the Aptr 214 and the Aptr 228 should be the same, pointing to the same instantiated software object of the Application Data software class 200. A software method fcn1 232 is inherited from the Derived Class 2 16 similarly to the software method fcn1 41 of the Application Class 2 37 of FIG. 2A. A local variable localSum 234 of FIG. 7 is initialized by using the value of the pointer variable APtr 228 to access the software method getSum 208 to set the variable localSum 234 to the value of the variable sum 202 of the Application Data software class 200. Therefore, the variable localSum 234 has a copy of the value of the variable sum 202 after a call to getSum 208. An assignment statement 236 of FIG. 7 then adds the value of the variable localSum 234 to the product of the local variables var2 22 and var3 24 of the Application Class 2, inherited from the Derived Class 2 16 of FIG. 2A and stores the result in the localSum 234 of FIG. 7. It is to be noted that the assignment statement 236 of the software method fcn1 232 of FIG. 7 is similar to the assignment statement 42 of the software method fcn1 41 of the Application Class 2 37 of FIG. 2A.

A software method call 238 then uses the value of the variable APtr 228 to access the software method setSum 206 to set the local variable sum 202 of the Application Data software class 200 to have a value of the localSum 234 of the Application Class 2 212. A write statement 240 then outputs the values of the var2 22 and the var3 24 of FIG. 2A and the value of the localSum 234 of FIG. 7. It is to be noted that the write statement 240 of FIG. 7 corresponds to the write statement 43 of FIG. 2A.

When the Application Process Unit 8 on the right hand side of the dashed line 29 of FIG. 2A is replaced by the Application Process Unit shown in FIG. 7, nothing needs to be changed on the left hand side of the dashed line 29 of FIG. 2A to achieve the same overall results as described previously with regard to FIG. 1 and FIGS. 2B–6. The differences between the Application Process Unit 8 of the right hand side of the dashed line 29 of FIG. 2A and the Application Process Unit 8 of FIG. 7 are that a static variable sum 32 is used for the Application Data software class 30 of FIG. 2A, while a local variable sum 202 of the Application Data software class 200 of FIG. 7 is shared by passing values to the local variables localSum 220 and localSum 234 of the Application Class 1 210 and the Application Class 2 212 respectively of FIG. 7, and that multiple inheritance is not used.

The Data Analysis Unit 6 is only concerned with the left hand side of the dashed line 29 of FIG. 2A and generally does not need to be changed for modifications to existing software application classes for the Application Process Unit 8 of the right hand side of the dashed line 29 of FIG. 2A. This results in a significant savings of programmer time for design and reusability of software objects.

Figure 8:
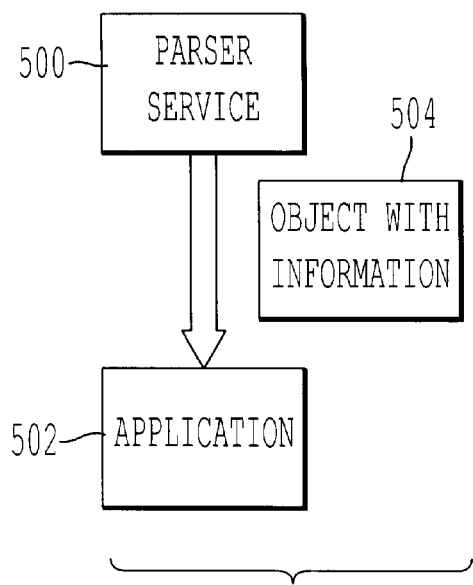
FIG. 8 illustrates a parser software module and application software module interface for instance processing.

FIG. 8 illustrates the interaction of software modules and software objects for an actual implementation using the interface described previously with regard to FIGS. 2A–3D. The actual implementation is a system written primarily in C++ to convert documents written in Standard Generalized Markup Language ("SGML") format into documents in HyperText Markup Language ("HTML") format. However, the invention is generally applicable to any application and any software language and is more particularly applicable to any object-oriented programming language. An abstract zero-level superclass having a virtual function is used to derive subclasses for software objects so that a software object is instantiated for processing every SGML document component type that an SGML parser recognizes. The virtual function is defined by code in the application class derived from each base subclass that is in turn derived from the abstract zero-level superclass. The software objects are instantiated from the derived application classes. For example, a software object to process an SGML start tag is instantiated from a base subclass, derived from the abstract zero-level superclass, in which code is defined for converting an SGML start tag to an appropriate HTML start tag for the output document. A software object to process an SGML attribute is instantiated from a base subclass, derived from the abstract zero-level superclass, in which code is defined for converting an SGML attribute to an appropriate HTML attribute for the output document. Each instantiated software object has the processing code defined as a software method for the virtual function definition so that each instantiated software object has the processing code defined for access by using the same name, which is the name of the virtual function of the zero-level abstract superclass, as all other instantiated software objects derived from the zero-level abstract superclass for processing components of documents in SGML format. Therefore, access to the processing code of a selected instantiated software object is accomplished by using a format having a reference to the selected software object and the common name of the virtual function.

An application driver software module controls processing by the system. The application software module sends requests to a parser software module to process input documents in SGML format to break up the documents into SGML components to be further processed into HTML components to create an output document in HTML format. As the parser software module recognizes an SGML component, the parser software module sends processing data to the instantiated software object which has been created to process the recognized component type, and then sends the application driver software a reference to the instantiated software object which has been created to process the recognized component type. The application software module then requests processing of the recognized component by a request in a format having the reference to the selected software object and the common name of the virtual function. There is no need for the application software module to recognize or know which instantiated software object is accessed for the requested processing. Therefore, the application software module need not have code for recognizing all possible SGML component types. This feature offers a significant savings in software programming and maintenance time and resources.

Referring to FIG. 8, there is illustrated the interaction of software modules and software objects for the actual implementation as described above using the interface described previously with regard to FIGS. 1–6. A ParserService software module 500 interacts with an Application software module 502. An Object with information 504 is used to store and process information specific to an instantiated object. The application software module 502 requests the ParserService software module 500 to break up a document into data items which are processed by plural software objects. The ParserService software module 500 determines the data type of the data items as it processes a document, and sends the Application software module 502 a pointer to a specific instantiated software object to process the data item of the data type which the ParserService software module 500 recognizes. The Application software module 502 has no need to know what data type of data item is recognized by the ParserService software module 500 as the Application software module 502 calls a software method for the specific instantiated software object by using a pointer variable having a data type which is compatible with reference values for any of the plural objects to reference a software method name which is common to all the objects in the system. The current value of the pointer is used to access the desired object so that the correct code is executed for the desired data type. The Application software module 502 does not need to determine any information besides the common software method name so that a reference to the common software method name, coupled with the reference value passed from the ParserService software module 500, will access the correct code for the desired object.

Figure 9:
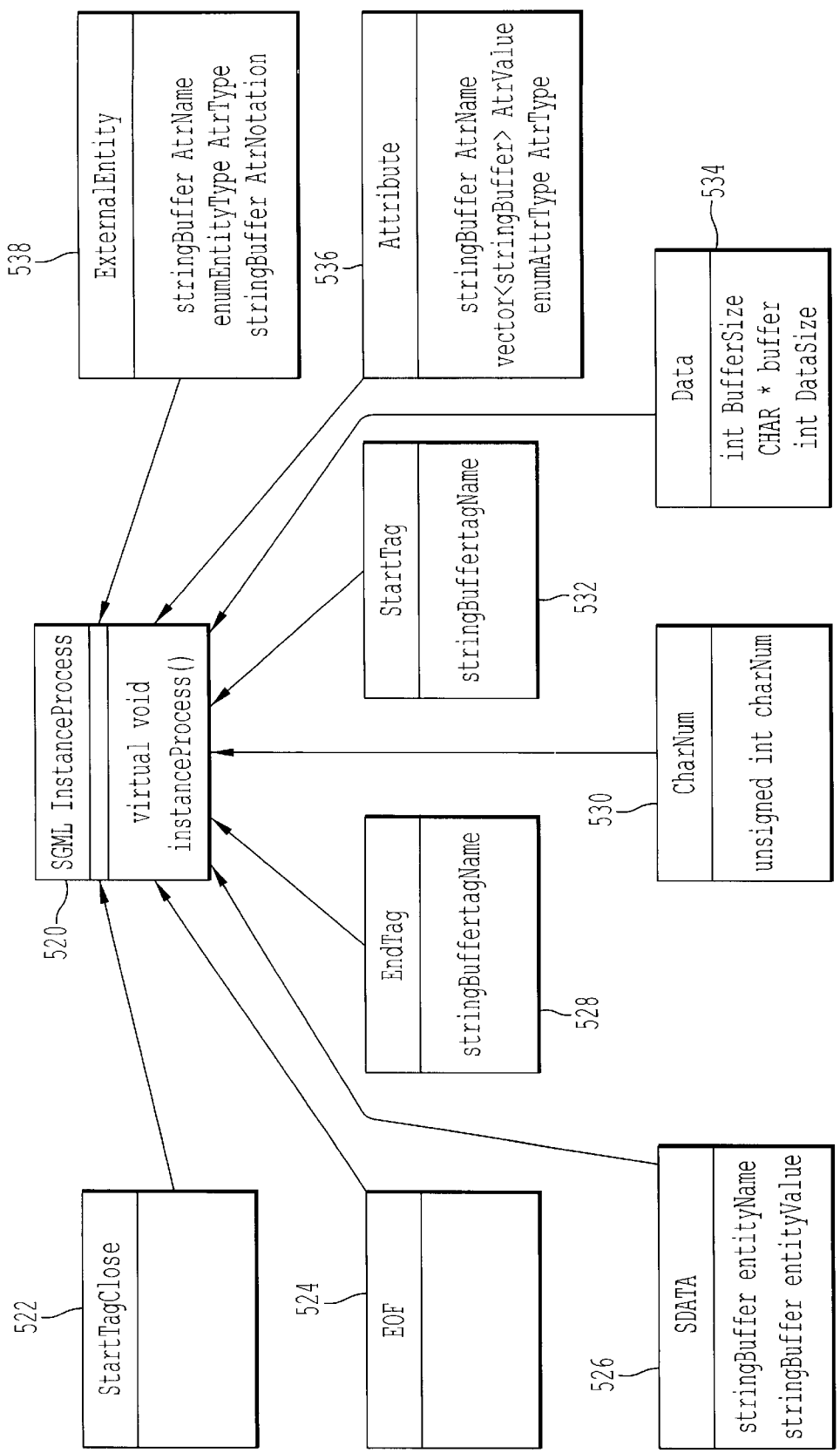
FIG. 9 illustrates a parser interface having an abstract software class which has plural derived software classes.

FIG. 9 illustrates an abstract class and derived class structure for the actual implementation of the system using the interface described previously with regard to FIGS. 1–6, as described previously with regard to FIG. 8. An abstract class SGMLInstanceProcess 520 has a virtual declared software method instanceProcess. The virtual software method instanceProcess is inherited by all derived classes and instantiated objects of derived classes. FIG. 9 illustrates nine derived classes of the SGMLInstanceProcess 520: a StartTagClose 522, an EOF 524, an SDATA 526, an EndTag 528, a CharNum 530, a StartTag 532, a Data 534, an Attribute 536, and an ExternalEntity 538. As described previously with regard to FIG. 8, each of these classes is designed for processing an SGML component type, recognized by an SGML parser, into HTML format for an output document in HTML format. However, when the application is changed from format conversion to other applications such as CD ROM production, the structure of FIG. 9, the SGML parser and the ParserService 500 of FIG. 8 do not need to be changed.

Each of the derived classes has specific data items with corresponding data types unique to the derived class. Each derived class also inherits the virtual function instanceProcess.

Application software modules define the virtual function by using either multiple inheritance from an application data software class and one of the derived classes as shown in FIG. 9 and as discussed below with regard to FIG. 10, or by the method discussed previously with regard to FIG. 7.

If an application software module has a declared pointer variable to reference a software object of the abstract class SGMLInstanceProcess 520, the application software module has the capability of executing instanceProcess by using the pointer variable referencing the name of the software method which is common to all derived classes. For example, if the ParserService software module 500 of FIG. 8 recognizes a data item for the StartTag 532 of FIG. 9, the ParserService software module 500 of FIG. 8 sends a value of a reference to an instantiated object for the derived class StartTag 532 of FIG. 9 in a pointer declared to reference the abstract class SGMLInstanceProcess 520 to the Application software module 502 of FIG. 8. The Application software module 502 then processes the data item by using the pointer variable referencing the software method name instanceProcess. The Application software module 502 has no knowledge of what software object data type is being passed. The value sent by the ParserService software module 500 is all that is needed to access the correct code to process the recognized data item for the StartTag 532 of FIG. 9.

Figure 10:
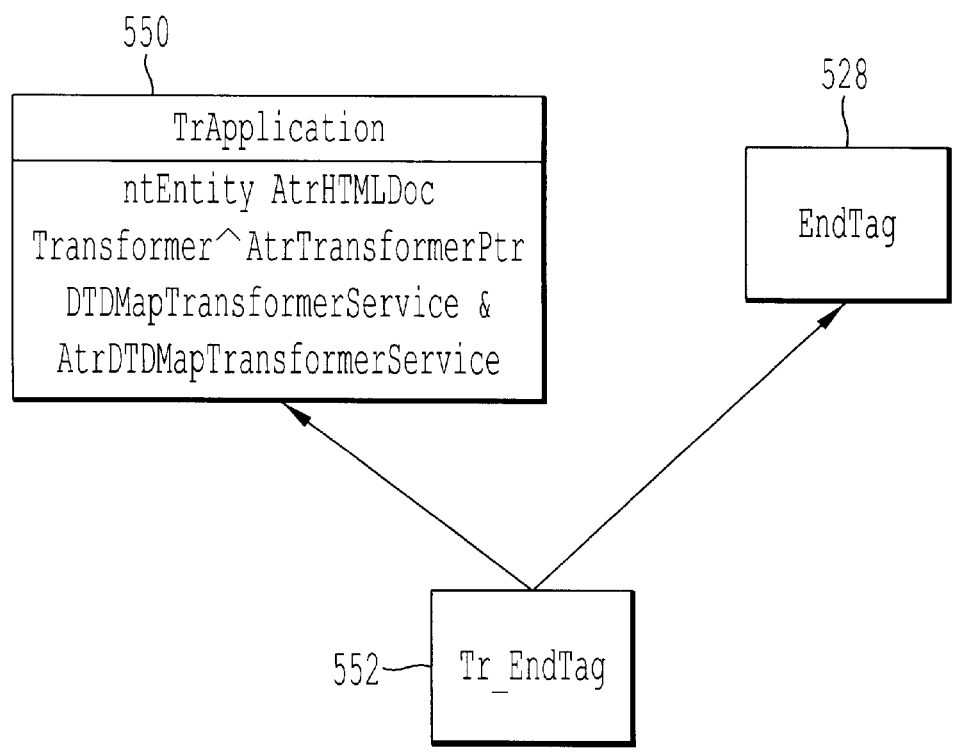
FIG. 10 illustrates an exemplary EndTag software class, a TrApplication software class, and a derived transformation application software class Tr_EndTag using multiple inheritance.

FIG. 10 illustrates an exemplary software object for an actual implementation of a system using the interface described previously with regard to FIGS. 1–6. A base software class TrApplication 550 corresponds to the Application Data 30 described previously with regard to FIG. 2A. The software class EndTag 528 corresponds to the derived software class EndTag 528 of FIG. 9 and to the derived software classes Derived Class 1 14 and Derived Class 2 16 of FIG. 2A. A software class Tr_EndTag 552 is derived from the TrApplication 550 and EndTag 528. The Tr_EndTag 552 corresponds to the Application Class 1 36 and the Application Class 2 36 discussed previously with regard to FIGS. 2A–6. The virtual function instanceProcess of the abstract class SGMLInstanceProcess 520 of FIG. 9 is defined in code in the Tr_EndTag 552 to access attributes of the instantiated object of the object-oriented class using multiple inheritance from TrApplication 550 and EndTag 520.

Figure 11:
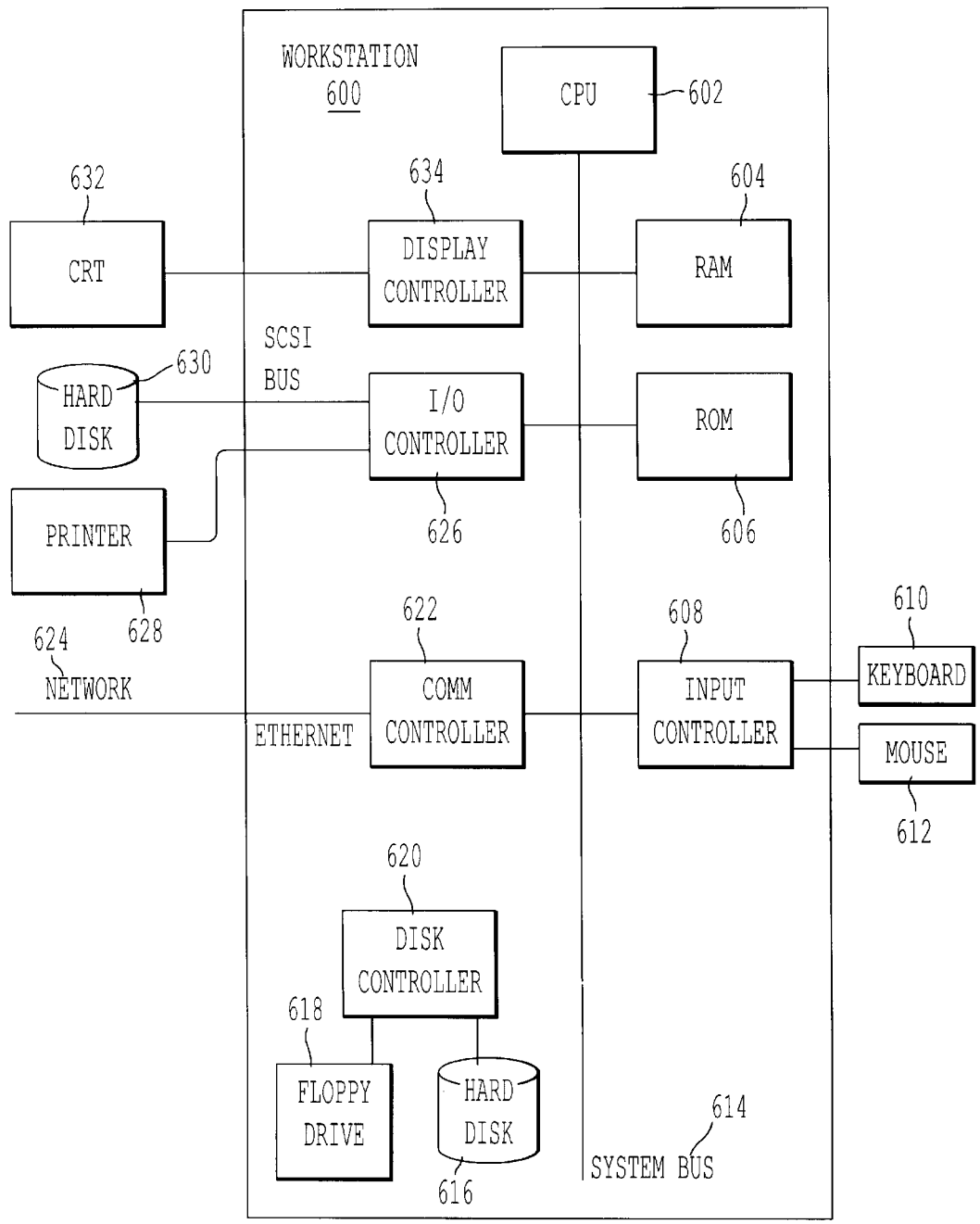
FIG. 11 illustrates a hardware embodiment of the present invention.
Figure 2A:
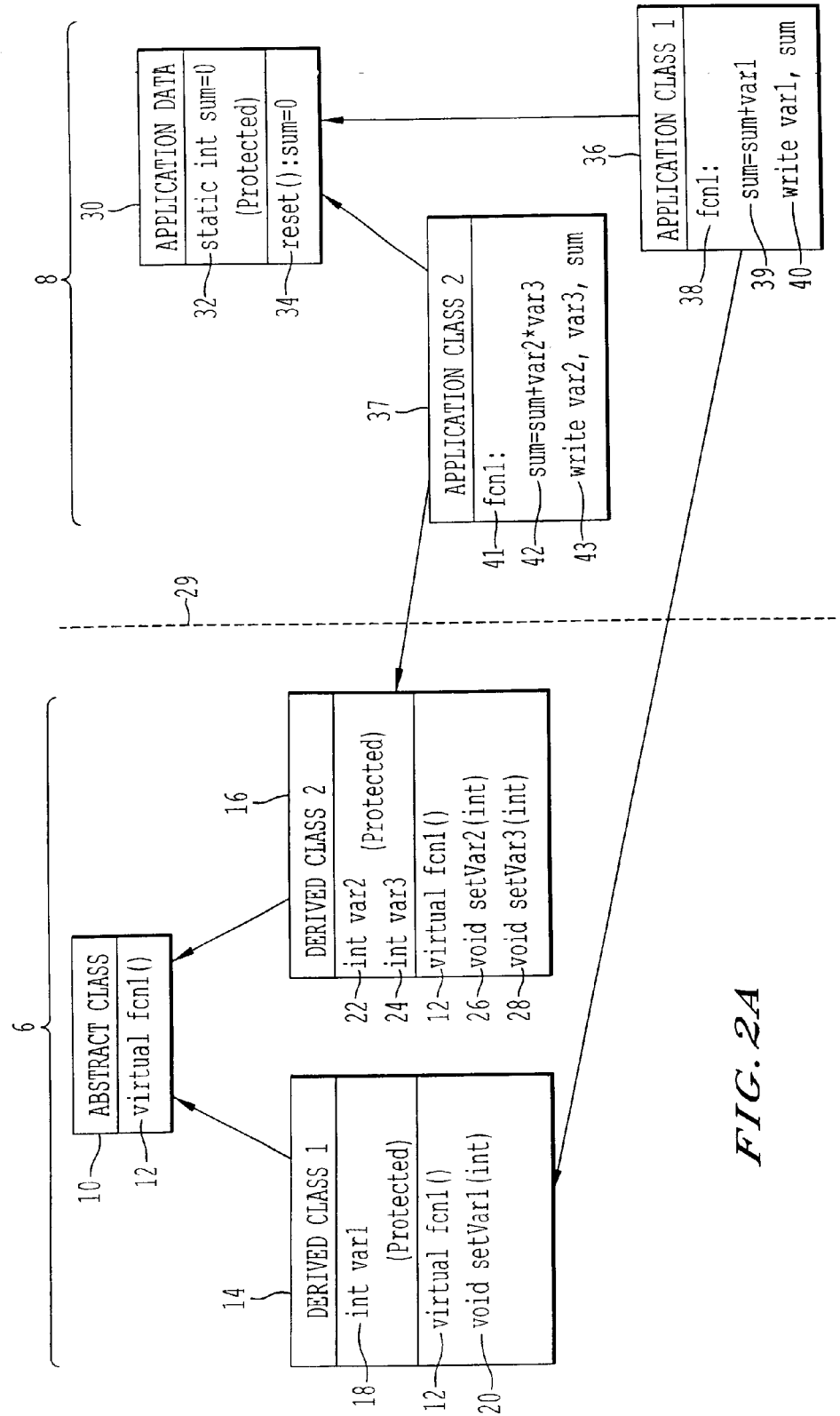
Figure 3B:
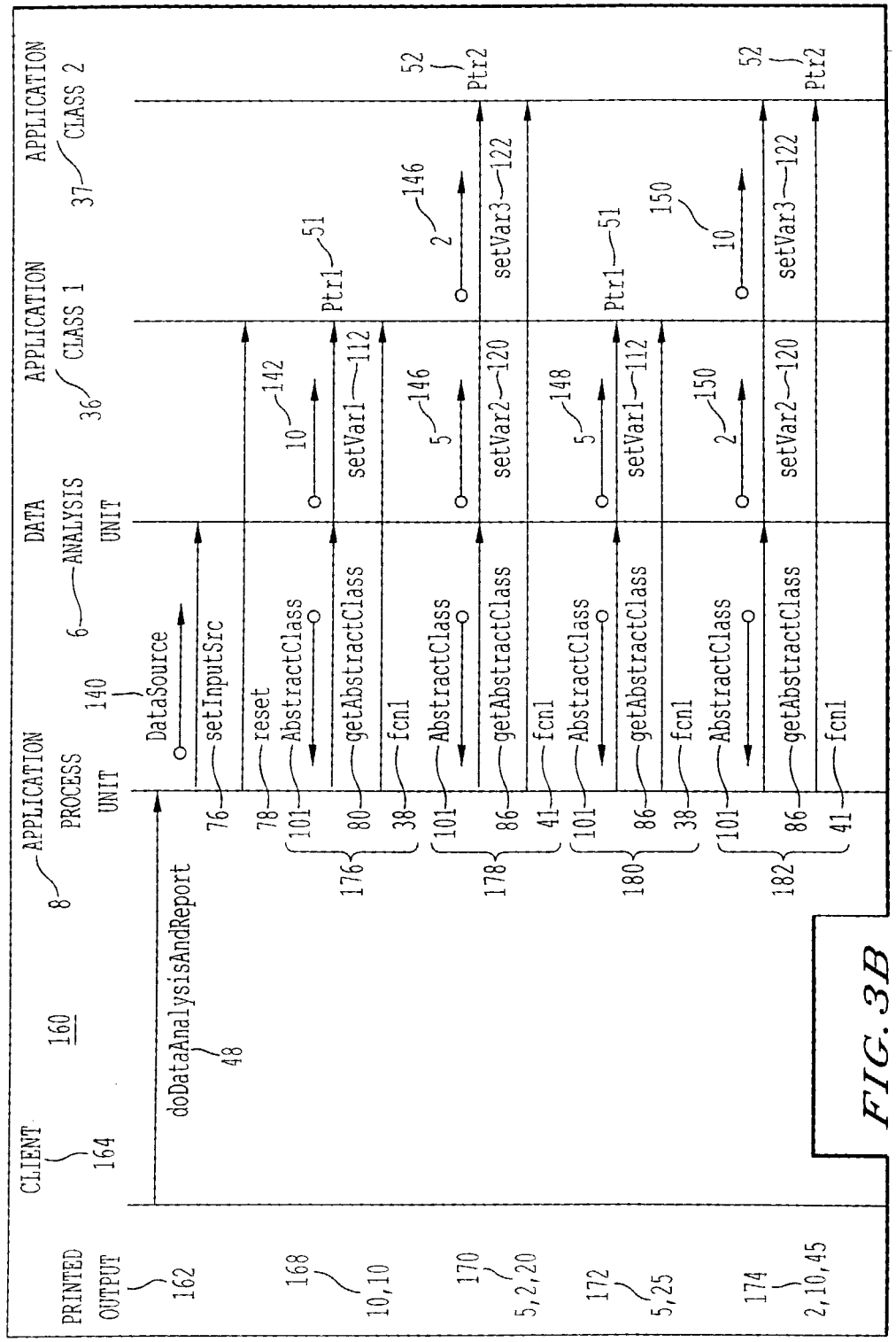
Figure 7:
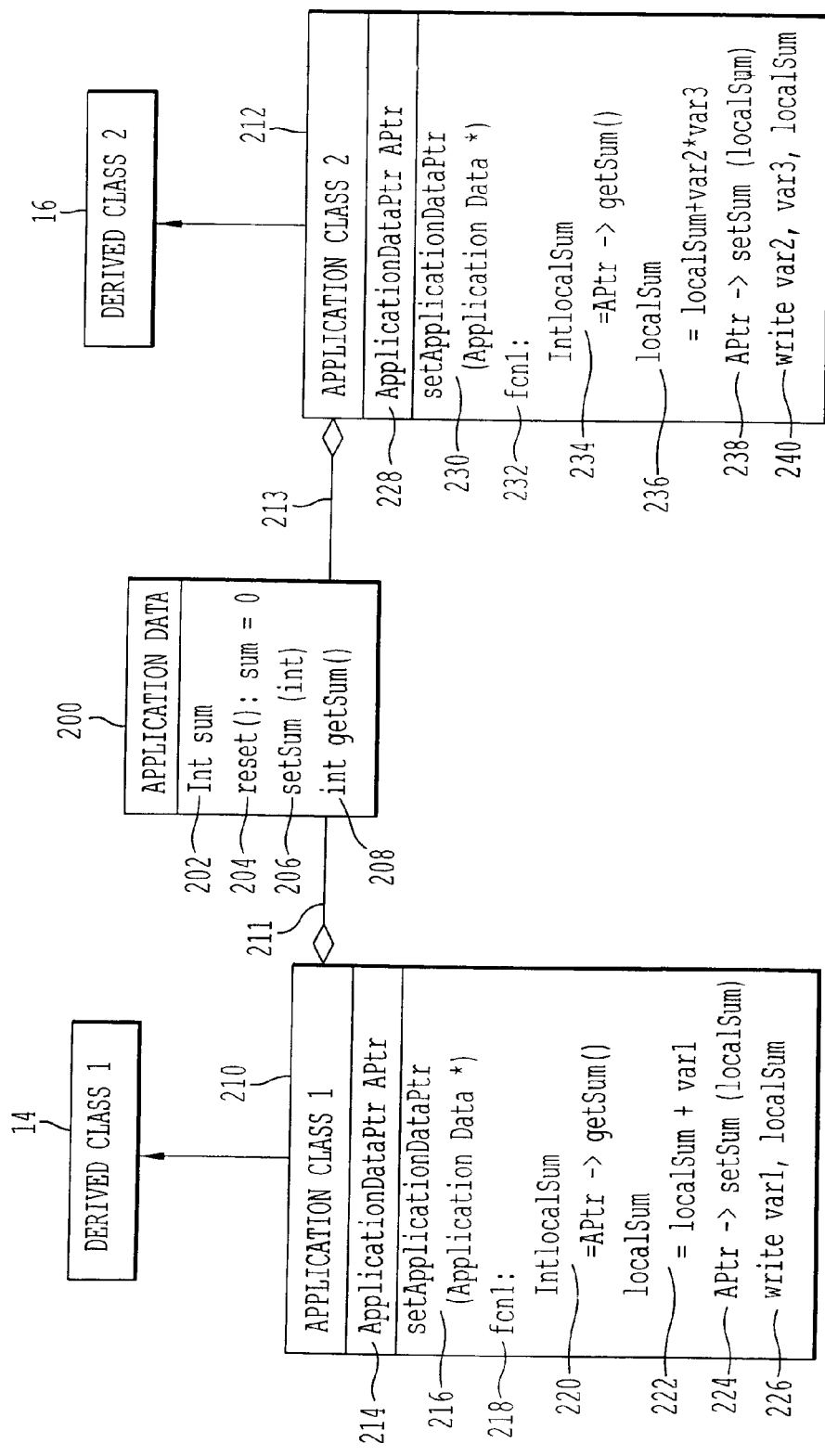
Figure 8:
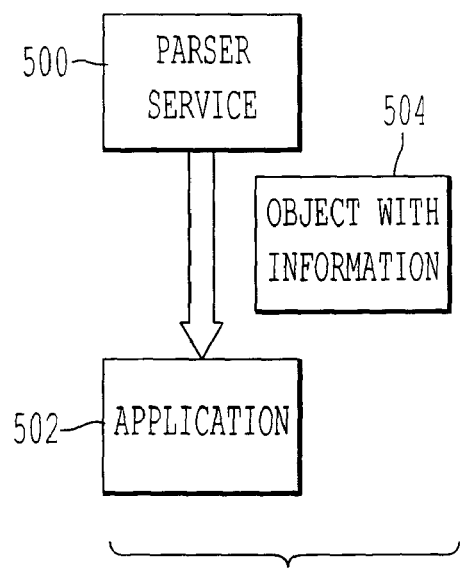
Figure 10:
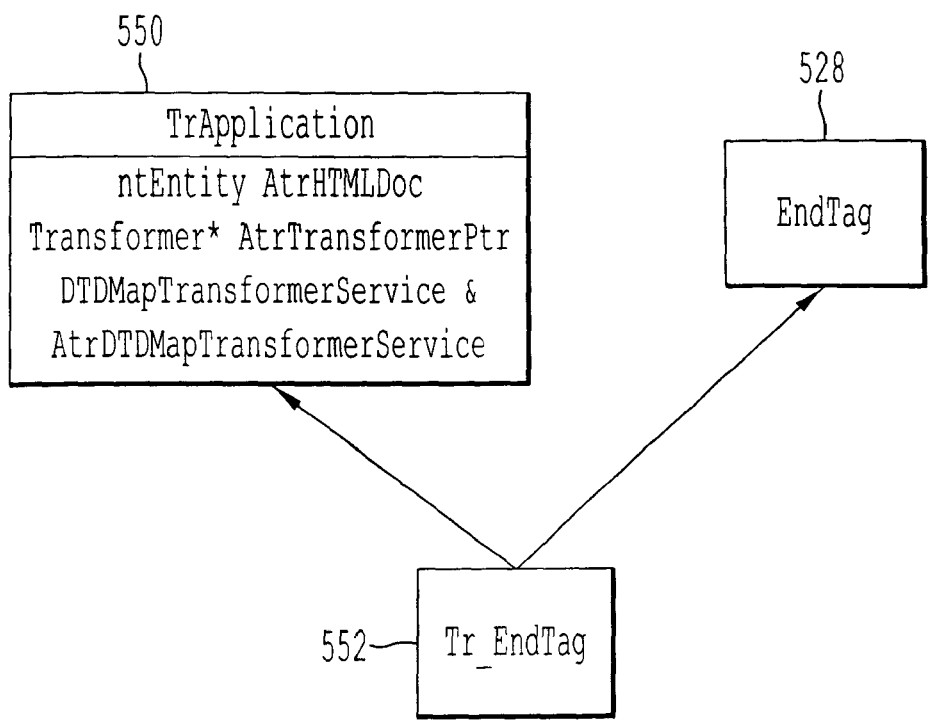
Figure 9:
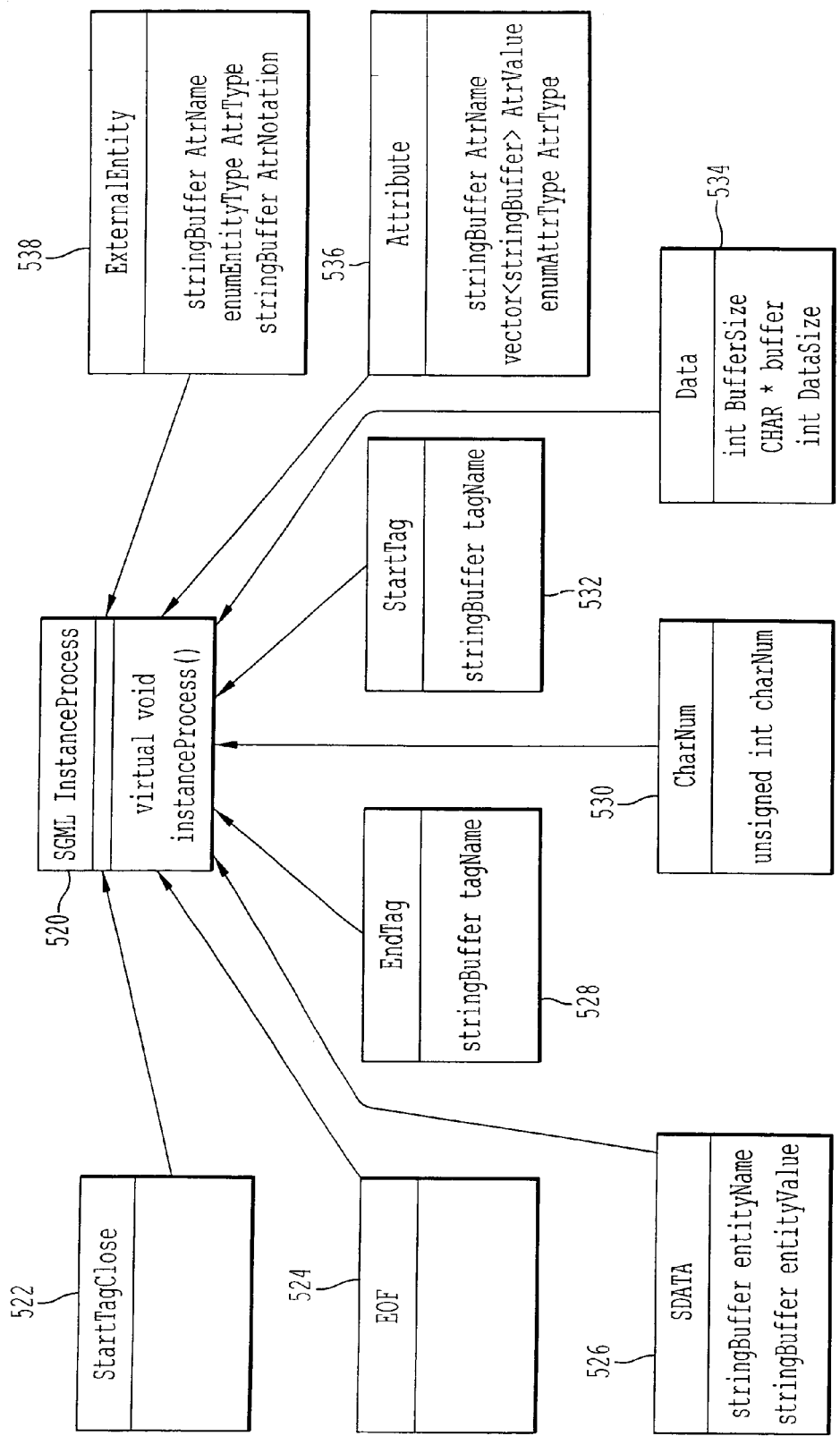

FIG. 11 illustrates an exemplary hardware configuration upon which the invention may be implemented. A workstation 600 has component parts a display controller 634, a central processing unit ("CPU") 602, a random access memory ("RAM") 604, a read only memory ("ROM") 606, an input controller 608, connected to a keyboard 610 and a mouse 612, a system bus 614, a hard disk 616 and a floppy drive 618 connected to a disk controller 620, a comm controller 622 connected to a network 624, and an input/output ("I/O") controller 626 connected to a hard disk 630 and a printer 628, and a cathode ray tube ("CRT") 632 connected to the display controller 634. The system bus 614 connects the CPU 602, the RAM 604, the ROM 606, the input controller 608, the disk controller 620, the comm controller 622, the I/O controller 626, and the display controller 634 for transmitting data over the connection line. For example, the computer code generated for execution is loaded into the RAM 604 for execution by the CPU 602, using the system bus 614, with input files stored on the hard disk 630, with other input coming from the keyboard 610 and the mouse 612 through the input controller 608, and from the hard disk 616 and the floppy drive 618, through the disk controller 620, onto the system bus 614. The system bus 614 interacts with the ROM 606, the network 624, and the comm controller 622.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A computer implemented method comprising the steps of:
   creating, for a data analysis unit, an abstract class having a declared virtual function;
   creating, for the data analysis unit, a first class derived from the abstract class, having the declared virtual function, and corresponding to a first type of data;
   creating for the data analysis unit, a second class derived from the abstract class, having the declared virtual function, and corresponding to a second type of data;
   creating, for an application process unit, a third class derived from the first class, having a first software definition for the declared virtual function, the first software definition being configured to operate on the first type of data;
   instantiating a first object of the third class;
   setting, by the application process unit, a first class reference to the first object in the data analysis unit;
   creating for the application process unit, a fourth class derived from the second class, having a second software definition for the declared virtual function, the second software definition being configured to operate on the second type of data;
   instantiating a second object of the fourth class;
   setting, by the application process unit, a second class reference to the second object in the data analysis unit;
   determining that an input information is one of a first type of data and a second type of data;

returning to a calling object, by the data analysis unit, an abstract class reference to one of the fist object if it is determined in the determining step that the input information is of a first data type and the second object if it is determined in the determining step that the input information is of a second data type; and invoking the virtual function by the calling object to process the input information by dereferencing the virtual function of the abstract class reference to the one of the first object and the second object.

2. The method of claim 1, further comprising the steps of:

creating for the application process unit, an application data class having at least one application data attribute, wherein the third class is derived from both the first class and the application data class, and the first software definition is further configured to use the at least one application data attribute.

3. The method of claim 1, further comprising the steps of:

creating for the application process unit, an application data class having at least one application data attribute; and instantiating a third object of the application data class, wherein the third class includes a reference to the third object.

4. The method of claim 3, wherein the application data class further includes at least one application data method.

5. A system for implementation by a computer, comprising:

memory;

means for creating, for a data analysis unit, an abstract class having a declared virtual function in the memory;

means for creating, for the data analysis unit, a first class derived from the abstract class, having the declared virtual function, and corresponding to a first type of data in the memory;

means for creating, for the data analysis unit, a second class derived from the abstract class, having the declared virtual function, and corresponding to a second type of data in the memory;

means for creating, for an application process unit, a third class derived from the fist class, having a fist software definition for the declared virtual function, the fist software definition being configured to operate on the first type of data in the memory;

means for instantiating a first object of the third class in the memory;

means for setting, by the application process it, a first class reference to the first object in the data analysis unit;

means for creating, for the application process unit, a fourth class derived from the second class, having a second software definition for the declared virtual function, the second software definition being configured to operate on the second type of data in the memory;

means for instantiating a second object of the fourth class in the memory;

means for setting, by the application process unit, a second class reference to the second object in the data analysis unit;

means for determining an input information is one of a first type of data and a second type of data;

means for returning to a calling object by the data analysis unit, an abstract class reference to one of the first object if it is determined by the means for determining that the input information is of a first data type and the second object if it is determined by the means for determining that the input information is of a second data type; and means for invoking the virtual function by the calling object to process the input information by dereferencing the virtual function of the abstract class reference to the one of the first object and the second object.

6. The system of claim 5, further comprising:

means for creating, for the application process unit, an application data class having at least one application data attribute in the memory, wherein the third class is derived from both the first class and the application data class, and the first software definition is further configured to use the at least one application data attribute.

7. The system of claim 5, further comprising:

means for creating, for the application process unit, an application data class having at least one application data attribute in the memory; and instantiating a third object of the application data class in the memory, wherein the third class includes a reference to the third object.

8. The system of claim 7, wherein the application data class further includes at least one application data method.

9. A computer program product including a computer readable medium comprising:

means for creating, for a data analysis unit, an abstract class having a declared virtual function in the computer readable medium;

means for creating, for the data analysis unit, a first class derived from the abstract class, having the declared virtual function, and corresponding to a first type of data in the computer readable medium;

mean for creating, for the data analysis unit, a second class derived from the type of data in the computer readable medium;

means for creating, for an application process unit, a third class derived from the first class, having a first software definition for the declared virtual function, the first software definition being configured to operate on the first type of data in the computer readable medium;

means for instantiating a first object of the third class in the computer readable medium;

means for setting, by the application process unit, a first class reference to the first object in the data analysis unit in the computer readable medium;

means for creating, for the application process unit a fourth class derived from the second class, having a second software definition for the declared virtual function, the second software definition being configured to operate on the second type of data in the computer readable medium;

means for instantiating a second object of the fourth class in the computer readable medium;

means for setting, by the application process unit, a second class reference to the second object in the data analysis unit in the computer readable medium;

means for determining that an input information is one of a first type of data and a second type of data;

means for returning to a calling object, by the data analysis unit, an abstract class reference to one of the first object if it is determined by the means for determining that the input information is of a fist data type and the second object if it is determined by the means for determining that the input information is of a second data type; and means for invoking the virtual function by the calling object to process the input information by dereferencing the virtual function of the abstract class reference to the one of the first object and the second object.

10. The computer program product of claim 9, further comprising:

means for creating, for the application process unit, an application data class having at least one application data attribute in the computer readable medium, wherein the third class is derived from both the first class and the application data class, and the first software definition is further configured to use the at least one application data attribute.

11. The computer program product of claim 9, further comprising:

means for creating, for the application process unit, an application data class having at least one application data attribute in the computer readable medium; and instantiating a third object of the application data class in the computer readable medium, wherein the third class includes a reference to the third object.

12. The computer program product of claim 11, wherein the application data class further includes at least one application data method.

* * * * *

UNITED STATES PATENT AND TRADEMARK OFFICE
CERTIFICATE OF CORRECTION

PATENT NO. : 6,578,090 B1
DATED : June 10, 2003
INVENTOR(S) : Tetsuro Motoyama et al.

It is certified that error appears in the above-identified patent and that said Letters Patent is hereby corrected as shown below:

Drawings,
FIG. 2A, element 12 of element 16, please change "virtualfcn 1()" to -- virtual fcn1 () --, as shown on the attached page.
FIG. 3B, horizontally align text element 168 with the arrow betweeen text elements 80 and 38; horizontally align text element 170 with the arrow betweeen text elements 86 and 41; horizontally align text element 172 with the arrow betweeen text elements 86 and 38; horizontally align text element 174 with the arrow betweeen text elements 86 and 41, as shown on the attached page.
FIG. 7, align indentation of text element 240 with text element 238, as shown on the attached page.
FIG. 9, element 528, change "stringBuffertagName" to -- stringBuffer tagName --; and element 532, change "stringBuffertagName" to -- stringBuffer tagName --, as shown on the attached page.
FIG. 10, element 550, change "Transformer^AtrTransformerPtr" to
-- Transformer* AtrTransformerPtr --, as shown on the attached page.

Signed and Sealed this

Seventh Day of September, 2004

JON W. DUDAS
*Director of the United States Patent and Trademark Office*